(12) United States Patent
Cooper

(10) Patent No.: US 12,027,862 B1
(45) Date of Patent: *Jul. 2, 2024

(54) INVERTER POWER SOURCE LOAD DEPENDENT FREQUENCY CONTROL AND LOAD SHEDDING

(71) Applicant: J. Carl Cooper, Reno, NV (US)

(72) Inventor: J. Carl Cooper, Reno, NV (US)

(*) Notice: Subject to any disclaimer, the term of this patent is extended or adjusted under 35 U.S.C. 154(b) by 77 days.

This patent is subject to a terminal disclaimer.

(21) Appl. No.: 17/976,787

(22) Filed: Oct. 29, 2022

Related U.S. Application Data

(60) Division of application No. 17/098,378, filed on Nov. 14, 2020, now Pat. No. 11,522,365, which is a continuation-in-part of application No. 16/444,280, filed on Jun. 18, 2019, now Pat. No. 11,183,843, which is a continuation-in-part of application No. 16/112,638, filed on Aug. 24, 2018, now Pat. No. 10,840,735, which is a continuation-in-part of application No. 13/481,804, filed on May 26, 2012, now Pat. No. 10,879,727.

(60) Provisional application No. 61/624,360, filed on Apr. 15, 2012, provisional application No. 61/598,564, filed on Feb. 14, 2012, provisional application No. 61/552,722, filed on Oct. 28, 2011, provisional application No. 61/490,253, filed on May 26, 2011.

(51) Int. Cl.
*H02J 3/14* (2006.01)
*H02J 3/38* (2006.01)
*H02J 3/40* (2006.01)
*H02J 9/06* (2006.01)

(52) U.S. Cl.
CPC ............. *H02J 3/14* (2013.01); *H02J 3/388* (2020.01); *H02J 3/40* (2013.01); *H02J 9/062* (2013.01)

(58) Field of Classification Search
CPC .......... H02J 3/14–144; H02J 3/32–322; H02J 3/38–50; H02J 2310/50–66; H02J 9/04–08

See application file for complete search history.

(56) References Cited

U.S. PATENT DOCUMENTS

| | | |
|---|---|---|
| 4,888,495 A | 12/1989 | Feron et al. |
| 5,914,467 A | 6/1999 | Jonas et al. |
| 6,172,432 B1 | 1/2001 | Schnackenberg et al. |
| 6,181,028 B1 | 1/2001 | Kern et al. |

(Continued)

FOREIGN PATENT DOCUMENTS

DE   102014115596 A1 * 4/2016 ............. H02H 11/00

OTHER PUBLICATIONS

W. Du, R. H. Lasseter and A. S. Khalsa, "Survivability of Autonomous Microgrid During Overload Events," Apr. 23, 2018, in IEEE Transactions on Smart Grid, vol. 10, No. 4, pp. 3515-3524, Jul. 2019 (Year: 2018).*

(Continued)

*Primary Examiner* — Rexford N Barnie
*Assistant Examiner* — David A Shiao

(57) ABSTRACT

A method and apparatus is described for conveying the amount of loading of a power source to a load control device by controlling the frequency of the AC power output from that power source in a manner that controlled frequency represents the loading. At a different location in the power system, the frequency is measured and the corresponding loading of the power source is used to prevent or alleviate a power source overload.

22 Claims, 2 Drawing Sheets

(56) References Cited

U.S. PATENT DOCUMENTS

| | | |
|---|---|---|
| 6,285,178 B1 | 9/2001 | Ball et al. |
| 6,313,632 B1 | 11/2001 | Kojovic et al. |
| 6,671,586 B2 | 12/2003 | Davis et al. |
| 6,686,547 B2 | 2/2004 | Kern et al. |
| 6,891,478 B2 | 5/2005 | Gardner |
| 7,015,599 B2 | 3/2006 | Gull et al. |
| 7,053,497 B2 | 5/2006 | Sodermann et al. |
| 7,208,850 B2 | 4/2007 | Turner |
| 7,338,364 B2 | 3/2008 | Baerlocher et al. |
| 7,356,384 B2 | 4/2008 | Gull et al. |
| 7,379,778 B2 | 5/2008 | Hayes et al. |
| 7,402,766 B1 | 7/2008 | Jonas et al. |
| 7,692,332 B2 | 4/2010 | Nordman et al. |
| 7,715,950 B2 * | 5/2010 | Lasseter .................. H02P 9/04 701/99 |
| 7,847,434 B2 * | 12/2010 | Wakitani ................ H02J 9/062 307/65 |
| 7,863,867 B2 | 1/2011 | Ganev et al. |
| 8,159,084 B2 | 4/2012 | Gilpatrick |
| 8,222,548 B2 | 7/2012 | Espeut, Jr. |
| 8,248,058 B2 | 8/2012 | Stair et al. |
| 8,324,755 B2 | 12/2012 | Stair et al. |
| 8,350,405 B2 | 1/2013 | Vicari et al. |
| 8,410,633 B2 * | 4/2013 | Batzler .................... H02J 9/08 307/41 |
| 8,569,912 B2 | 10/2013 | Lim et al. |
| 8,653,679 B2 | 2/2014 | Lim et al. |
| 8,736,103 B2 | 5/2014 | Vicari et al. |
| 9,088,180 B2 | 7/2015 | Wedel et al. |
| 9,281,715 B2 | 3/2016 | Lim et al. |
| 9,312,665 B2 | 4/2016 | Robinson et al. |
| 9,362,845 B2 | 6/2016 | Tesch |
| 9,876,343 B2 | 1/2018 | Lathrop et al. |
| 9,887,546 B2 | 2/2018 | Batzler et al. |
| 9,966,761 B1 * | 5/2018 | Kim ........................ H02J 4/00 |
| 9,979,337 B2 | 5/2018 | Iles |
| 10,069,331 B2 | 9/2018 | Pancheri et al. |
| 10,554,074 B2 | 2/2020 | Pancheri et al. |
| 2002/0024323 A1 * | 2/2002 | Fukushima .............. H02J 3/38 322/8 |
| 2002/0072868 A1 | 6/2002 | Bartone et al. |
| 2002/0084697 A1 | 7/2002 | Radusewicz |
| 2003/0036822 A1 | 2/2003 | Davis et al. |
| 2004/0007876 A1 | 1/2004 | Braun et al. |
| 2004/0051387 A1 * | 3/2004 | Lasseter ................. H02J 3/381 307/80 |
| 2004/0075343 A1 | 4/2004 | Wareham et al. |
| 2004/0078153 A1 | 4/2004 | Bartone et al. |
| 2004/0117330 A1 | 6/2004 | Ehlers et al. |
| 2004/0267386 A1 | 12/2004 | Lingemann |
| 2005/0067900 A1 * | 3/2005 | Bailey ..................... H02J 3/007 307/45 |
| 2005/0109387 A1 | 5/2005 | Marshall |
| 2005/0116814 A1 | 6/2005 | Rodgers et al. |
| 2005/0216131 A1 | 9/2005 | Sodermann et al. |
| 2006/0018069 A1 | 1/2006 | Gull et al. |
| 2006/0071554 A1 | 4/2006 | McNamera et al. |
| 2006/0072262 A1 | 4/2006 | Paik et al. |
| 2006/0087784 A1 * | 4/2006 | Ba-Thunya .............. H02H 3/08 361/93.1 |
| 2006/0208574 A1 * | 9/2006 | Lasseter .................. H02J 3/38 307/69 |
| 2006/0229768 A1 * | 10/2006 | Chassin ............ H02J 13/00034 700/286 |
| 2006/0276938 A1 | 12/2006 | Miller |
| 2007/0008076 A1 | 1/2007 | Rodgers et al. |
| 2007/0010916 A1 | 1/2007 | Rodgers et al. |
| 2007/0053123 A1 | 3/2007 | Filippenko |
| 2007/0222294 A1 | 9/2007 | Tsukida et al. |
| 2007/0222295 A1 | 9/2007 | Wareham et al. |
| 2007/0276547 A1 | 11/2007 | Miller |
| 2007/0282547 A1 | 12/2007 | Howell et al. |
| 2008/0093851 A1 | 4/2008 | Maeda et al. |
| 2008/0203820 A1 | 8/2008 | Kramer et al. |
| 2008/0212343 A1 * | 9/2008 | Lasseter ................... H02J 3/30 363/39 |
| 2009/0027932 A1 | 1/2009 | Haines et al. |
| 2009/0150100 A1 | 6/2009 | Pifer et al. |
| 2009/0216386 A1 * | 8/2009 | Wedel ....................... H02J 9/06 700/295 |
| 2009/0224690 A1 | 9/2009 | Xu et al. |
| 2009/0299540 A1 | 12/2009 | Abi-Samra |
| 2009/0322154 A1 * | 12/2009 | Ichikawa ................ B60L 53/31 307/82 |
| 2009/0326724 A1 * | 12/2009 | Lasseter ................. H02J 3/381 700/297 |
| 2010/0007300 A1 | 1/2010 | Hein |
| 2010/0017045 A1 * | 1/2010 | Nesler .................. B60L 53/665 700/295 |
| 2010/0019507 A1 | 1/2010 | Hashimoto et al. |
| 2010/0019574 A1 | 1/2010 | Baldassarre et al. |
| 2010/0038966 A1 | 2/2010 | Espuet, Jr. |
| 2010/0090532 A1 | 4/2010 | Shelton et al. |
| 2010/0134073 A1 | 6/2010 | Kohn |
| 2010/0207448 A1 * | 8/2010 | Cooper .................... H02J 3/381 307/20 |
| 2010/0225167 A1 | 9/2010 | Stair et al. |
| 2010/0328850 A1 | 12/2010 | Remmert |
| 2011/0006547 A1 * | 1/2011 | McLean ................. H02P 9/007 290/40 A |
| 2011/0062888 A1 | 3/2011 | Bondy et al. |
| 2011/0064445 A1 | 3/2011 | Yashiro |
| 2011/0109158 A1 * | 5/2011 | Olsen ..................... B60L 50/51 307/10.1 |
| 2011/0112704 A1 | 5/2011 | Kibbee |
| 2011/0175450 A1 | 7/2011 | Vicari et al. |
| 2011/0198928 A1 | 8/2011 | Lee |
| 2011/0210606 A1 | 9/2011 | Selker |
| 2011/0254370 A1 | 10/2011 | Wischstadt et al. |
| 2011/0298285 A1 * | 12/2011 | Lim ......................... H02J 3/14 307/41 |
| 2011/0298286 A1 | 12/2011 | Batzler et al. |
| 2012/0053744 A1 | 3/2012 | Manson |
| 2012/0056436 A1 | 3/2012 | Russell et al. |
| 2012/0056474 A1 * | 3/2012 | Larson ..................... H02J 1/14 307/9.1 |
| 2012/0065786 A1 | 3/2012 | Beraud et al. |
| 2012/0158196 A1 | 6/2012 | Eldershaw et al. |
| 2012/0179929 A1 * | 7/2012 | Chen ......................... G06F 1/28 307/29 |
| 2012/0242145 A1 | 9/2012 | Espeut, Jr. |
| 2012/0292920 A1 | 11/2012 | Yamamure et al. |
| 2013/0066482 A1 | 3/2013 | Li et al. |
| 2013/0103223 A1 | 4/2013 | Liebel |
| 2013/0116847 A1 | 5/2013 | Frampton et al. |
| 2013/0158726 A1 | 6/2013 | Mauk |
| 2013/0159738 A1 | 6/2013 | Mauk et al. |
| 2013/0270908 A1 * | 10/2013 | Wedel ...................... H02J 3/14 307/39 |
| 2013/0320762 A1 * | 12/2013 | Trudel ...................... G05F 1/70 323/205 |
| 2014/0097683 A1 * | 4/2014 | Piyabongkarn .......... G05F 1/66 307/26 |
| 2014/0111006 A1 | 4/2014 | Baldassarre |
| 2014/0246925 A1 * | 9/2014 | Porter ....................... H02J 3/14 307/115 |
| 2015/0180236 A1 * | 6/2015 | Nakao ..................... H02J 7/342 320/103 |
| 2015/0180367 A1 | 6/2015 | Tesch |
| 2015/0180393 A1 | 6/2015 | Tesch |
| 2015/0311843 A1 | 10/2015 | Iles |
| 2016/0152154 A1 * | 6/2016 | Mizuno .................. B60L 53/18 307/10.1 |
| 2016/0181861 A1 * | 6/2016 | Familiant .............. H02J 7/0048 307/66 |
| 2016/0204651 A1 * | 7/2016 | Pancheri ................ G01R 11/06 307/23 |
| 2017/0008413 A1 | 1/2017 | Reineccius |
| 2017/0168516 A1 | 6/2017 | King |
| 2017/0214225 A1 | 7/2017 | Ramachandran et al. |
| 2019/0027933 A1 | 1/2019 | Lian et al. |

(56) References Cited

U.S. PATENT DOCUMENTS

| | | | |
|---|---|---|---|
| 2019/0273393 A1 | 9/2019 | Chen | |
| 2020/0122585 A1* | 4/2020 | Bhat | G05B 19/0426 |
| 2020/0235580 A1* | 7/2020 | McDonnell | H02J 3/34 |
| 2021/0273453 A1* | 9/2021 | Nishio | B60L 50/50 |

OTHER PUBLICATIONS

Saber Falahati, Seyed Abbas Taher, Mohammad Shahidehpour, "Grid frequency control with electric vehicles by using of an optimized fuzzy controller", Jul. 5, 2016, Applied Energy, vol. 178, 2016, pp. 918-928, (Year: 2016).*
A. Raghami, M. T. Ameli and M. Hamzeh, "Primary and secondary frequency control in an autonomous microgrid supported by a load-shedding strategy," Feb. 13, 2013, 4th Annual International Power Electronics, Drive Systems and Technologies Conference, Tehran, Iran, 2013, pp. 282-287 (Year: 2013).*
S. Dinkhah, C. A. Negri, M. He and S. B. Bayne, "V2G for Reliable Microgrid Operations: Voltage/Frequency Regulation with Virtual Inertia Emulation," Jun. 19, 2019, 2019 IEEE Transportation Electrification Conference and Expo (ITEC), Detroit, MI, USA, 2019, pp. 1-6 (Year: 2019).*
English machine translation of DE102014115596A1 published Apr. 28, 2016 (Year: 2016).*
Schneider Electric, 8910DPA92V02 Product Data Sheet, copyright 2011.
Generac, Load Control Module brochure, printed Apr. 7, 2010.
Tesla Motors, High Power Connector Installation Manual, (date unknown).
Simon Cohen, Which apps would you like to see on the iPad?, Feb. 10, 2010.
Asko, 30" Tall Digital Ceramic Pedestal Heater with Remote, Model 5350, Mar. 2006.
Generac, Nexus LTS connections, (date unknown).
Generac, Technical Manual Nexus Smart Switch, Apr. 22, 2010.
Generac, Technical Manual Nexus LTS Load Shed Switch, Aug. 16, 2010.
Cummins, Automatic transfer switches, copyright 2007.
Cummins, Gghe Generator set data sheet, copyright 2009.
Cummins, Ggma Generator set data sheet, copyright 2009.
Kirk A. Kleinschmidt, A Closer Look at Inverter Generators, ca. 2008.
Cummins, PowerCommand 3100 Digital generator set control, copyright 2008.
Generac, RTSS Load Shed Automatic Transfer Switch Technical Manual, Rev. C May 2, 2008.
Lou Mane, "Subnet Metering—A Practical Approach", Dec. 25, 2005 GE ESL Magazine Summer 2005.
"Billing & Revenue Metering" Dec. 18, 2017, SATEC.
"A guide to Submeter Deployment and Greater Energy Management Insights" Feb. 15, 2014, Legrand.
Generac Power Systems, Inc. (Aug. 14, 2020) Owners Manual For PWRcell Automatic Transfer Switch, Rev. B. Generac Power Systems, Inc. Waukesha, WI 53189, USA. Retrieved from https://www.generac.com/service-support/product-support-lookup/product-support-details?productid=d2736fee-be12-4237-a6cb-04f029652a44&serialNumber-CXSC100A3&registered=false.
Generac Power Systems, Inc. (Aug. 28, 2019) Generac Pwrcell Solar + Battery Storage System Rev. Oct. 2020. Generac Power Systems, Inc. Waukesha, WI 53189, USA. Retrieved from https://www.generac.com/generaccorporate/media/library/content/clean%20energy/pwrcell_consumer_brochure.pdf?ext=.pdf.
Generac Power Systems, Inc. (Nov. 5, 2020) Owner's Manual Generac PWRcell Inverter Rev. C. Generac Power Systems, Inc. Waukesha, WI 53189, USA. Retrieved from https://www.generac.com/service-support/product-support-lookup/product-support-details?productid=8ba6048c-9b6d-46a1-acb9-27af74be6b74.
Generac Power Systems, Inc. (Jul. 29, 2020) Line Diagrams PWR Cell. Generac Power Systems, Inc. Waukesha, WI 53189, USA. Retrieved from https://www.generac.com/service-support/product-support-lookup/product-support-details?productid=8ba6048c-9b6d-46a1-acb9-27af74be6b74.
Generac Power Systems, Inc. (Nov. 16, 2018) Generac Owner's/Installation Manual Smart Management Module (SMM) Rev. B Nov. 16, 2018. Generac Power Systems, Inc. Waukesha, WI 53189, USA.
Generac Power Systems, Inc. (Mar. 26, 2019) Generac Owner's/Installation Manual 100A Smart Management Module (SMM) Rev. A Nov. 16, 2018. Generac Power Systems, Inc. Waukesha, WI 53189, USA.

* cited by examiner

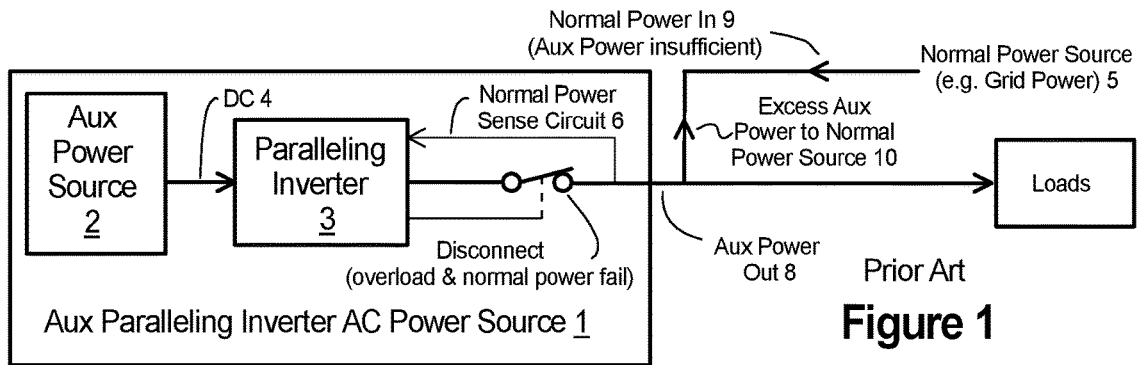
Figure 1 — Prior Art
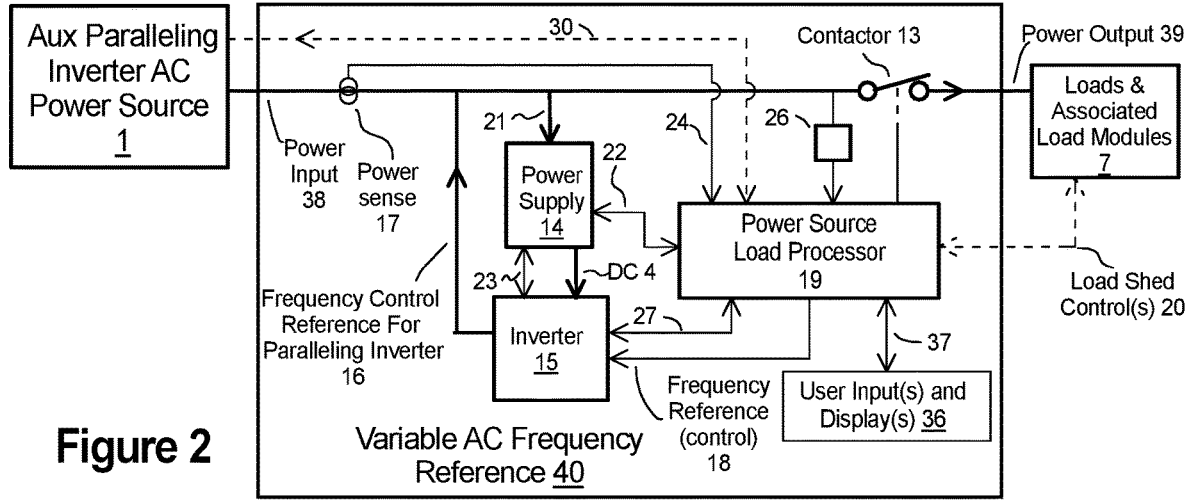
Figure 2
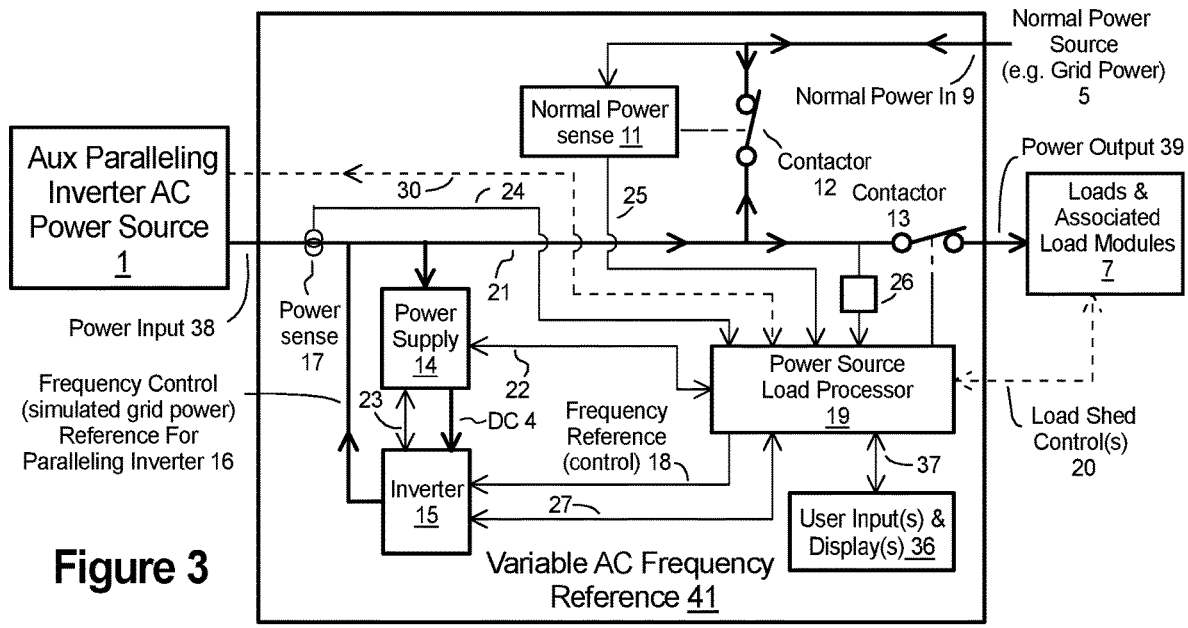
Figure 3

INVERTER POWER SOURCE LOAD DEPENDENT FREQUENCY CONTROL AND LOAD SHEDDING

This application is a divisional application of and incorporates herein by reference in its entirety application Ser. No. 17/098,378 titled Inverter Power source Load Dependent Frequency Control And Load Shedding filed Nov. 14, 2020 which is a continuation in part of and incorporates by reference application Ser. No. 16/444,280 titled Power Source Load Control filed Jun. 18, 2019 and issued as U.S. Pat. No. 11,183,843 on Nov. 23, 2021 which in turn is a continuation in part of and incorporates by reference in its entirety application Ser. No. 16/112,638 titled Power Source Load Control, filed Aug. 24, 2018 and issued as U.S. Pat. No. 10,840,735 on Nov. 17, 2020, which application in turn is a continuation in part of and incorporates by reference in its entirety application Ser. No. 13/481,804 filed May 26, 2012 titled Power Source Load Control which issued as U.S. Pat. No. 10,879,727 on Dec. 29, 2020 which application in turn claims benefit of, and incorporates by reference in their entirety, provisional patent applications: Power Source Load Control, application No. 61/490,253 filed May 26, 2011; Power Source Load Control, application No. 61/552,722 filed Oct. 28, 2011; Load Control, application No. 61/598,564 filed Feb. 14, 2012 and Genset Overload Control, application No. 61/624,360 filed Apr. 15, 2012. All of the above applications and patents are incorporated herein by reference in their entirety and for all purposes as if they were set forth in detail herein.

BACKGROUND OF THE INVENTION

Field of the Invention

The invention is related to load shedding to prevent or cure overloading of small electrical AC (alternating current) power sources used for portable, net metering and backup power and in particular those utilizing electronic control of engine—alternator and inverter power sources to provide AC power. Inverter-based power sources have become popular due in part to the development of low cost, high current, high reliability switching semiconductor devices such as SiC MOSFETs. These inverter devices provide AC power wherein the output power is generated by electronic circuitry commonly referred to as an inverter. Simplistically described, such inverters generally receive a DC input (for example from a solar array), or an AC input (for example from an internal combustion engine—alternator) followed by AC being converted to DC, and utilize semiconductor devices to convert the DC power to AC power.

Because the output AC power is electronically generated, (and/or electronically controlled) it has a steady AC frequency corresponding to the standard AC frequency for the geographic area where the power source is intended to be used (e.g. 60 Hz in the Americas and parts of Asia, 50 Hz for much of the rest of the world and 400 Hz for some vehicles, particularly aircraft). Similarly, in some internal combustion engine and alternator power sources the speed of the engine, and hence the frequency of the output AC power, is kept at a steady standard AC frequency by that control. It is noted however, most electronically controlled engine and alternator devices will still suffer a momentary frequency change and then quickly return to the standard frequency when a large load is connected or disconnected. Inverter devices do not suffer this momentary frequency change but some devices will exhibit a momentary voltage change.

Many small, portable power generating devices called inverter generators are finding commercial demand because, as compared to older technology internal combustion power sources with similar power output capability, they are smaller, lighter, quieter and more fuel efficient. These devices incorporate an engine and alternator to convert fuel to AC electricity, the AC is then converted DC and the DC is then used by an inverter circuit which creates output AC power. The AC frequency of these inverter generators is stable at the standard frequency (50 Hz., 60 Hz., or 400 Hz.) and that frequency does not change with loading or other operating conditions because that output power is electronically generated by the inverter circuit in response to an electronic frequency reference such as a crystal or NCO (numerically controlled oscillator). Many inverter generator response to an overload is to go into an output current limiting mode wherein the voltage of the output power is reduced to keep the current from increasing above a known amount and if the overload persists then the output power is shut off. During that overload, the power frequency remains unchanged, but the voltage drop can be damaging to some loads.

Typically, an inverter circuit's AC power output is a low harmonic sine wave, although lesser quality sine waves, or even square waves, are generated in some lower cost inverters. The ability to generate a low harmonic sine wave, along with electronic frequency control at the standard frequency, makes many inverter generators suitable for paralleling with the utility power grid. This is particularly true for solar, wind, water and geothermal power generation systems, including those used in homes and small businesses. This grid paralleling allows reducing power consumption from the grid in proportion to the amount of locally generated power, and to even send excess locally generated power into the grid.

There are many different frequency controlled engine—alternator devices as well as frequency controlled inverter circuit power source devices which can be used to generate the output AC power, which are well known in the art. Importantly for understanding the present invention, the frequency of the AC output power is controlled electronically to the standard AC frequency in response to a frequency reference such as a crystal, resonator or other such high stability circuit when operating in a stand-alone condition. When paralleling the power grid, the frequency of the output AC power is controlled in response to the power grid standard frequency. In both cases, the AC output frequency is controlled to be the standard frequency and the output frequency is unrelated to the load on the power source. This is unlike many lower cost internal combustion engine and alternator type of generators where the engine does not have sufficient power to maintain the correct RPM at high loads, the frequency of the AC power is controlled by a mechanical governor and the frequency drops substantially when the generator is overloaded.

Description of Related Art

Small power systems are well known in the art and have become increasingly attractive to home and small business owners. Inverter generators, and in particular portable inverter generators have become popular due to their relatively low weight relative to their power capability, efficiency, ease of use and simple paralleling ability. Alternative power systems such as solar panels and wind generators and associated inverters have become popular with homeowners and small businesses. Additionally, because of the increase in extended electric utility power outages caused by natural and manmade disasters including hurricanes, tornados and fires, as well as preemptive public safety power shutoffs, rotating power outages and the like, backup power systems have become very popular. Typically, these backup power systems utilize an internal combustion engine powered alternator which, for reasons of cost and economy, is sized to have a maximum power output capability which is considerably less than that provided by the home or business utility service they are used to back up. In addition to being used for backup power, these systems are also utilized for prime power, that is to provide power where utility power is not available, or the power source needs to be portable such as in vehicles of various types, for example motor homes and live in watercraft.

These power systems vary in complexity and convenience to the user, ranging from fully manually operated, that is, the user has to manually carry the generator to the area of the load(s), in the case of a backup for lost grid power run an extension cord out of a door or window, start the power system and plug in desired ones of the home or business electrical loads such as lights, heating and other essential devices. At the other end of complexity, fully automatic systems using automatic transfer switches will sense a utility power outage or other power problem, start the power source and switch from the utility to the backup power source, often with only a momentary loss of power to the house or business.

Because these non-grid power systems typically have a limited maximum power output capability relative to the number of loads a user wishes to connect, load shed devices are frequently utilized in backup power systems, as well as off grid prime power systems. Many load shed devices operate to sense when the power source is overloaded, disconnect all of the corresponding loads to reduce the timely power output to less than the generator's maximum output. It is preferred that a timely power output is a substantially instantaneous measure of the power output and may be determined in response to various sensing of power as will be discussed herein below. Problems can still occur when these internal combustion engine and alternator combination type of generators, and even inverter based power sources, are overloaded. The problems include tripping their output circuit breakers, overheating and poor-quality, particularly low voltage power.

The poor-quality power mentioned above may include reduced output voltage and for some devices, low frequency AC power. The low frequency is caused in some inexpensive engine—alternator devices by the internal combustion engine not being able to provide enough torque to keep the alternator rotating at the proper speed, thus causing the lower frequency AC to be output. Often, the aforementioned load shed devices operate by measuring the frequency of the AC power provided by the generator. When the power drops below the standard frequency by some amount, or combinations of amount and time, that drop is assumed to be due to an overload and the load shed devices then disconnects the loads. In many systems, multiple load shed devices are utilized, for example one for every large load which might need to be shed. Unfortunately, by the time the loads are shed, the overload has already happened for several seconds.

Other load shed devices utilize electronic measurement of the generator output, for example such as by use of shunts or current transformers which measure the output current, and when the current reaches an amount which causes the generator to be overloaded, the load shed device operates to remove loads from the generator. Typically, the load shed device communicates with a load, for example, an air conditioner compressor to turn the load on and off, or with an associated load module to turn the electric power being supplied to the load, for example a sump pump, on and off.

The type communication used with the current measurement types of load shed devices includes wired (e.g. low voltage control and data cables), wireless (e.g. IEEE 802 type networks), and PLC (power line carrier radio frequency or "carrier current") types of data communication channels. While load shed devices utilizing wired, wireless and PLC communications can operate in a more precise fashion than the low frequency detection devices, the cost, difficulty of installation and complexity of the necessary communication channels to achieve a reliable load shed system adds to the overall system cost. The need for reliable communications is very important. As just one of many examples of this importance, if a large load in a backup power system is inadvertently connected to, and heavily overloads the generator, it could cause the generator's output circuit breaker to trip. The tripped breaker will leave the system without any power from the generator until the circuit breaker is reset.

Some examples of systems using inverter circuits to generate AC power including those where the underlying power is generated from one or more power source such as solar panels, wind turbine, water turbine, geothermal power, fuel cell and engine powered alternators. The generated power is sometimes stored. Some examples of the various storage devices including, but not limited to, one or more of batteries and other chemical devices, supercapacitors and flywheels. The power grid may also be used to provide energy for storage. For example, many homes and small businesses utilize batteries to store excess solar power and/or charge the batteries during times, such as at night, of low-cost power from a grid. The stored power is used to provide AC power when grid power fails, during times of expensive grid power or during times of heavy grid loading. The inverters receive the generated or stored power and provide AC output power in single or multiple phases at a known voltage and precise frequency, often at the same standard frequencies, voltages and phases provided by utilities. These inverters are often referred to as island inverters.

Prior art island inverters are often used to provide power where no gird power is available, or for aforementioned vehicles such as motor homes and watercraft where connecting to grid power is not possible. In just one of many examples, due in part to light weight, better efficiency, quiet operation and reasonable cost, there are now portable inverter generators available comprising an internal combustion engine to provide rectified DC power to an inverter circuit which in turn provides sinusoidal AC power at a standard frequency. These are particularly useful for vehicles and self-contained portable operation such as providing power at worksites and for camping and tailgating.

Users of such systems frequently have more loads to power than their inverter generator can handle. For example, at a construction site several extension cords may be plugged into an inverter generator with a different worker and an electrically powered machine using each extension cord for power. The inverter generator may not be able to simultaneously power all of those machines. As a result, a worker may turn on his machine while other workers' machines are running, and it will cause an output circuit breaker in the inverter generator to trip. Load shedding is needed but because inverter generators provides AC power having a steady frequency which does not change with load, frequency detection load shed systems won't work. The various types of load shedding described above which use wired, wireless or PLC carrier can be made to work but are difficult to use and costly.

Typically, load shed systems using prior art wired communications such as low voltage data or control cables require, for each load to be shed, the installation of a cable from the load shed controller to the point where the power to that load is controlled. That adds labor and material costs to the construction of a new home, business or vehicle which plans to use load shedding, and is a particular problem when the installation is to be in an existing structure or vehicle. It is also difficult to use with portable systems such as those used at construction sites.

Prior art wireless communication systems require transmitters, receivers, usually some sort of network and considerable care to avoid frequency congestion, interference and reception problems due to inadequate transmission power, distance and radio frequency fading and shielding due to structures. For portable system a well-designed wireless communication system will work but the cost can be prohibitive.

PLC systems carry data on the conductor that is also used to simultaneously carry the AC power to the load, but like wireless communications needs transmitters and receivers and in addition electrical power circuitry devices such as circuit breakers and switches as well as wire installation methods like metal staples, boxes and conduit can cause signal loss. These can be particularly bad problems for existing wiring, for example it might require numerous circuit breakers to be replaced with breakers which can pass the PLC radio frequency carrier, or rewiring circuits to avoid radio frequency carrier losses.

Clearly, all of these various problems make the use of load shedding with inverter based devices and in particular portable devices, difficult and expensive, not to mention potential reliability problems. Communications channel failures from a poorly designed system can cause problems like a sump pump being incorrectly shed, or a power source output breaker trip from an overload.

In another of many examples, inverter circuits are designed to provide power in parallel with another power source, such as solar panel inverters which parallel a utility power grid connection to allow power from the solar panels to power some or all of the electric loads in a home or business. These are commonly known as grid tie inverters. If there is excess power available from the solar panels it is sent into the utility power grid by the inverter, hence the name grid tie. Selling power back to the utility can be described by saying that pushing excess power from the solar panel into the utility grid will cause the utility's electric power meter to spin backwards, however this only happens with old electro-mechanical power meters. Most utility power meters are now all electronic and can separately measure power flowing out of and into the grid. This is commonly known as net metering.

Many grid tie inverters can also operate as island inverters when grid power fails. Because the grid tie inverters usually are not capable of providing the same amount of power as the grid connection, they, like the island inverter generator described above, also need load shedding but it poses many of the same problems as set out above.

In yet another example, portable inverter generators are designed in a manner that they can be paralleled with another portable inverter to provide more power to loads than a single device is capable of. These are commonly referred to as paralleling inverter generators. This provides considerable efficiency as compared to a single large generator, and also provides a degree of redundancy in that one inverter generator can fail and be disconnected, leaving the working inverter generator to power the loads. Load shedding is also needed for these devices in order to prevent overloading, but again the steady AC power frequency makes the use of the frequency based load shedding described above expensive, difficult or impossible.

BRIEF SUMMARY OF THE INVENTION

The invention herein is concerned with preventing and alleviating overload of small electrical power sources. Small, as used with power sources, is defined herein and in the claims as those which provide single or multiple phase AC power of 440 volts or less and 400 amps or less. Small power sources may be portable devices, portable defined herein and in the claims as devices which provide electricity by means of a liquid or gaseous fuel internal combustion engine that turns a mechanically connected generator or alternator to generate electrical power, and which further includes power outlets which allow extension cords, electric-powered tools, appliances and other electrical loads to be plugged in and thereby receive AC power. The output AC power may be provided directly from the AC alternator or via an inverter circuit.

Small power sources also include, but are not limited to, those given in the Background of the Invention above. Of importance in respect to the instant invention, the frequency of the output AC power of small power sources may be controlled by a rotating speed of an alternator or an electronic inverter circuit. The inverter operates in grid tie or island systems or both. Small power sources may be part of a small power system, for example a net metering system and/or a backup power system, details of which will be set out in detail below. Small power systems are defined herein, and in the claims, as those used for an individual home or business and providing single or multiple phase power of 440 volts or less and 400 amps or less. Small backup power systems are defined herein, and in the claims, as those used for an individual home or business with a single or multiple phase power grid service connection of 440 volts or less and 400 amps or less.

Overloads occur when a power source's output power exceeds the maximum output power which the manufacturer of the power source designed it to provide. To alleviate an overload the invention operates such that loads are disconnected to return the output power to a level lower than the maximum. The invention may also prevent loads from being connected when that connection would cause an overload. Further, the invention may operate to prevent loads from consuming an amount of power which is allocated to those loads, even though that amount is less than the total the power source can provide. In this manner the additional power capability over and above the amount those loads will consume, can be used for other purposes or loads. This is often called load shedding although that term is also used in respect to keeping the load supplied by a utility service entrance below some established value for purposes of preventing higher charges for using excessive power and similar usage considerations which are not concerned with overloading a power source. It is important to keep in mind that the term load shed, particularly as used in the prior art, can refer to either operation of curing an overload or preventing high charges for using excessive power. The meaning must be determined from the context of the usage or otherwise.

Inventive power source load control, including load shedding, is taught (along with numerous other teachings) extensively in the priority applications which are incorporated herein by reference. Those teachings and examples will not be copied over and the teachings of load shedding herein are provided as an aid to understanding. In particular the few teachings of load shedding herein are intended to specifically point out and describe the inventive use of controlled variable AC frequency power which as can be used with the numerous and various types and embodiments of load control, and in particular load shedding, taught in the priority applications. Accordingly, the person of ordinary skill in the art will know and understand such features and benefits of the inventive use of controlled variable frequency power from the teachings herein.

The priority applications listed above teach (among several other teachings) that the output AC power frequency from some generators, is stable and not responsive to the load on the device. Prior art load shedding systems which rely on the generator output AC power frequency dropping below the standard frequency (e.g. below 50 Hz., 60 Hz., or 400 Hz.) to indicate an overload cannot be used. This is because the AC power frequency of inverter devices and some engine—alternator devices with electronic frequency control do not change appreciably, if at all, when the device passes the point of overloaded.

The priority applications recognize this steady frequency characteristic and teach sensing the output current of the power being supplied by the genset and regulate the engine RPM via its control module or throttle to control a known drop in frequency of the supplied AC power. In this manner the controlled change from the standard frequency to a different known frequency of the supplied AC power may be utilized as a measure of genset load or overload. A load control device can comprise a frequency measurement circuit to measure that frequency of the AC power from the genset and control connection or disconnect one or more loads in order to prevent or alleviate an overload of the genset.

By controlling the frequency of AC power provided to one or more loads, in response to the amount of power consumed from the power source by the one or more loads, that controlled frequency of the AC power can be utilized in the power system and thereby indicate that amount of power being consumed. By using a known accurate and repeatable control of AC power frequency, for example such as by use of a power inverter, reliable frequency representation of an amount or range of amounts of power source output power is achieved. This is a considerably different control of the frequency of the AC power which normally is controlled to be as close as possible to the standard AC power frequency for the location, (e.g. 60 Hz in North America) under all operating conditions.

It may be noted that in a power source, and in particular an inverter generator type of power source, there are several points where measuring an amount of power flow would be useful in preventing and mitigating overloads. Commonly, current is used as a measurement of power but it may also be measured in watts. There are different types of power, peak, mean, active, reactive and apparent to name a few. In power sources having two or more hot leads, the power may be different in each. The output power may be the sum, average or highest of all hot lead measurements, or just one hot lead measurement may be used. In many inverter generators the alternator provides multi-phase AC power (having a widely varying frequency) with the amount depending on the output power of the inverter. That AC power is rectified and used by the inverter circuit to create the output AC power which has a fixed standard frequency.

Thus, these various types and locations of power which passes through the various circuits; output from the alternator, output from the rectifier and output from the inverter, are all important and all are a measure of output power (with varying degrees of accuracy). Again, one or more types of power may be sensed, active, reactive, apparent power, per-phase apparent power, fundamental, harmonic, power factor, peak power, mean power, RMS power, voltage/current peak and RMS, and even temperatures as desired for a particular use and application of the invention. The amount of power may be expressed in suitable units corresponding to the sensing and/or calculations relative thereto including watts, amps, peak, mean, RMS, percentage used of an amount, percentage remaining of an amount, temperature, etc.

And, while they are somewhat different due to the power losses in each circuit in the series, these amounts are nevertheless suitable for use in the invention, affecting only accuracy. In some instances, the inverter generator's overload protection may utilize one or more of these somewhat different power amounts but they are nevertheless all measures of the amount of output power. And indeed, the power source's internal measurement used for the internal overload protection will be a suitable measurement to be used in the invention and may be referred to as an amount of output power.

As used herein and in the claims, and unless power type, units, measurement location and/or other identifying information of precisely what power is being measured and where, the reference to amount of output power is meant to encompass any one or more, or combinations of, these several types of sensed and calculated amounts. For example, measure or sense "an amount of output power" is intended to cover any one or more of the various locations and types enumerated above.

This substantial and novel improvement allows for accurate control of connection of loads to the power source as well as their disconnection (or reduction of power consumption), both to prevent overloading from occurring when connecting a load, but also to mitigate an overload which may later occur due to the current consumption of uncontrolled loads. This improvement is a substantial advancement of the load control art, particularly as compared to those prior art devices that utilize uncontrolled frequency drops of many internal combustion engine and rotating alternating devices, and in particular where the AC power frequency is not accurately controlled but rather uncontrollably changes in a mostly unpredictable response to the overload of the engine/alternator system.

Frequency dependent load shed circuits which are part of transfer switches are known in the art. These devices sense substantial AC power frequency decreases which exist for a period of several seconds as a result of an engine—alternator genset being overloaded by a substantial amount. It is pointed out that these circuits do not operate to prevent overloads, they only shed all of the loads which can be shed and do so well after the overload has occurred. Further, they do not shed loads one by one, rather they shed all of their loads simultaneously. By comparison, in order to determine when a generator is already overloaded the present invention may operate very quickly and with very slight overloads, shedding only one or a few loads as necessary to cure the overload. The present invention may operate not only to determine that a small overload has already happened and shed a load, but the invention may operate to prevent overloads by not connecting a load which it determines would cause an overload, or by limiting the power which is supplied to or consumed by a load when it is connected. Many other features and capabilities of the invention will be known from the teachings herein.

Unlike the prior art frequency dependent load shed circuits, the present invention may control the frequency of AC power provided by a power source such that there is a known and controlled frequency relationship to the power being provided (or, some other measure of power from which the point(s) of overload can be reasonably determined) sense, at a different location in the power system, that AC power frequency and therefrom know one or more of: the amount of load on the power source; how much additional power is available from the power source; if the power source is nearing its maximum output (and nearing overload); and know beforehand, if connecting a given load will cause an overload of the power source, and the amount of overload that will be caused. Additionally, by controlling the AC power frequency, e.g. by use of frequency shift keying, much more information can be transmitted throughout a power system by the AC power being provided by the invention. As just three of many possible parameters and other information that can be transmitted via the variable frequency AC power, are that the power source is actively outputting power, the load on the power source (e.g. in watts or amps) and the temperature of the electronics in the inverter (15) (or of the power source 1, 29) (e.g. in degrees F. or C).

As used herein, and in the claims, the maximum output of a power source is one or more manufacturer specified amount of power that can be provided without an overload. A maximum output may be specified in different quantities and under specified conditions, e.g. watts, amps, unity power factor, continuous operation. A maximum output may depend on and be different for the number of power phases and type of multiple phase connection (e.g. wye, delta). A maximum output may be derated under various installation configurations and operating conditions, for example altitude, temperature and fuel type and quality. A maximum amount of power may be that which is allocated for powering controlled loads in a system where the power which is sent to uncontrolled loads is not being measured as part of the timely power output as is taught herein below.

It is known to the person of ordinary skill in the art that an output circuit breaker or other type of protection device or circuit rating is not a maximum output in that when the amount of power reaches that rating, the circuit breaker or other protection trips and disconnects the load. Thus, the power source has already been overloaded for some amount of time. Operation with repeated tripping of the output circuit breaker or other protection may void the manufacturer's warranty even if it doesn't immediately damage the power source. It is noted that not all manufacturers provide a maximum output specification, choosing instead to merely advertise an "up to" power output and leave it to the customer to guess what the maximum output is for a given installation and operation.

There is often more than one manufacturer specified maximum output power, or other type of maximum parameter, examples include: maximum short term output, sometimes referred to as a surge or an electric motor starting capacity; maximum output which can be drawn for a given time frame, usually associated with and taking into account how long it takes internal components to heat to some maximum permitted level; e.g., maximum short term output that may be drawn and meet the manufacturers power quality specifications (for example one or more of, voltage, distortion, harmonics, and the like); maximum long term output when used as a backup power source; maximum long term output when used as a prime power source, maximum internal temperature, maximum ambient temperature. A particular manufacturer may specify one or more of these maximums, refence some industry standard and/or use some other maximum(s). The invention may be practiced using any one or more of these maximums.

When speaking of overload, the meaning is with respect to exceeding any one of these chosen maximums, unless overload is otherwise specified. For example, the power frequency may represent that a power source has exceed the maximum internal temperature when it is not exceeding the maximum output power. Nevertheless, the power source will be overloaded. As just two of many possible causes, the ambient temperature may be high or cooling air is thin because of altitude. It will not be necessary that the type of overload be conveyed by the output power frequency, although that information may be conveyed if desired. As discussed further below and used in the claims, amount of output power and similar phrases used in respect to controlling output power frequency and overload, will be understood to mean that amount of output power includes for the operating conditions which can cause an overload. This amount of power may be quantified by measurements other than just watts and amps for electrical power, just one such measure of many available being temperature as in the example above.

The invention may be utilized with standard power systems and frequencies, for example single or multiple phase, 110, 120, 208, 220, 240 or other standard voltage, 50, 60 or 400 Hz systems. If desired, other voltages and frequencies may be used. The invention will be particular useful in load shed systems for portable, off grid and grid backup power sources as well as other power sources having limited power output capability which is less than the total power which could be consumed by a group of connected and potentially powered loads.

The invention described herein will be known to the person of ordinary skill in the art to include providing a reference signal to, or providing control of a reference signal used in, an engine control or inverter circuit to control and change the frequency of the AC power output in response to the load on, or timely power output of, the power source. For paralleling inverter circuits, the reference signal or reference signal control may be provided directly to the inverter circuit or may be provided as another AC power signal to which the inverter circuit phase locks in a paralleling operation. In this paralleling operation this AC power signal simulates an AC grid power signal such the inverter circuit phase locks to that simulated AC grid power signal. In another instance of providing a simulated AC grid power signal to the inverter circuit in order that the inverter will phase lock to that signal, a reliable manner of precisely controlling the frequency of the inverter AC power output may be achieved. This is particularly useful for existing inverter circuits, e.g. such as inverter generators and solar panel inverters.

By such precise control of the AC power output frequency, that frequency may be responsive to the amount of power being output by the inverter circuit, and in particular the frequency may be controlled to represent output; current, watts, power factor and/or loading. Alternatively, or in addition, the remaining power available from the inverter circuit may be represented by the power frequency. The information conveyed by the frequency, representing units of measure (or unitless measure) suitable for the application as desired, is communicated everywhere the AC power is wired. The frequency of the AC power may also be controlled in a manner to represent the operation of the inverter circuit such that the information conveyed thereby can be used by a load or associated load module to determine whether or not the load may be connected to the inverter power or should be disconnected from the inverter power, or only partially connected (e.g. using current control or current limiting) to the inverter power, in order to prevent or mitigate an overload or other potential problems of the inverter.

In one embodiment of providing a control or reference signal to the inverter circuit, a simple, low cost but reliable manner of precisely controlling the frequency of the AC power output may be achieved. In this manner the AC power output frequency may be used to communicate a measure of the amount of power being output by the inverter circuit to load control devices. In particular the loading of, or alternatively the remaining power available from the inverter circuit or other measure of output or remaining available power relative to one or more maximums of one or more parameters, is communicated everywhere the AC power is wired.

Importantly, the present invention, unlike PLC (power line carrier radio frequency or "carrier current") types of data communication, uses the frequency of the AC power. This AC power frequency is not a radio frequency carrier superimposed on or carried with the power, rather, it is the power. It is robust, it goes everywhere the power goes and unlike PLC, the power frequency cannot be lost to circuit components which do not pass a PLC radio frequency carrier, or to wiring methods that attenuate a radio frequency carrier and it does not require any special components or wiring. The frequency can also be measured at points in the power system which are not used to power a load. For example a status monitor which displays whether or not the power system is in use and if so the amount of load or remaining power available, can be plugged into a power outlet anywhere in the power system.

It will be known to the person of ordinary skill in the art from the present teachings of the invention that the AC power frequency may be controlled in a manner to represent the operation of the inverter and associated circuitry and devices such that the information conveyed thereby can be used by a load or associated load module to determine whether or not the load may be connected to the inverter power or should be disconnected from the inverter power, or be only partially connected to the inverter power. In some embodiments the information may further include the degree of urgency for making changes, in order to prevent or mitigate an overload of, or problem with, the inverter. The frequency may also be used to convey other information about the inverter and its associated circuitry and devices, as just one of many examples such as conditions and operation of one or more power generation and/or storage devices. As just one example of the use of urgency, a serious fault with the power source, e.g. a circuit failure, might require that all loads be immediate disconnected. Or, a lubricating oil sensor might detect and warn that oil needs to be changed or added in the next several operating hours. That warning might be displayed on the above status monitor.

Examples of such conditions and operation include, but are not limited to: ambient temperature, heating, freezing, cooling; air conditions such as altitude, humidity, temperature, pressure, density and other environmental conditions; further conditions for an internal combustion engine including quality, levels and warnings relating to fuel, lubricating oil, coolant fluid or cooling air. Additional conditions and operation for related energy generation and storage devices may be conveyed including ones of: voltage, current, wattage, power factor; environmental conditions such as levels of wind and sunlight; battery or capacitor conditions; temperature, charge, charge rate, discharge, discharge rate, voltage, electrical or leakage.

Those and many other conditions and operations for the system providing the AC power will be known to the person of ordinary skill in the art from the teachings herein and the AC power frequency may be controlled to convey them. Of particular interest for more complex systems is the ability to convey much more than just loading by utilizing various forms of frequency related signaling, including but not limited to frequency shift keying, to communicate information. This communication is possible because of the accurate control of the reference frequency, and hence the frequency of the AC power, which is afforded by the invention.

BRIEF DESCRIPTION OF THE DRAWINGS

The drawings are shown in single line form as is common in the art, each line, for example the DC 4 line between 2 and 3 of FIG. 1, representing multiple circuits. Arrow heads are also shown to assist in understanding, for example such as on the DC 4 line at 3, to generally show the important direction of flow of the important ones of the multiple circuits being represented. These indications are not however exhaustive or exclusive and other circuits may flow in the same or opposite direction along the same path. In particular signals and power may simultaneously flow in two directions. This may at times be shown by opposite indications such as on the normal power in flow 9 and excess auxiliary power to normal power source flow 10. Some circuits which are shown will be known to be optional, for example the separate voltage sense 26 of FIG. 2 may be eliminated if the voltage is reasonably constant with no need to measure it, or a separate voltage 26 circuit may be replaced by combining voltage sensing with 17.

Devices and circuits of the Figures are shown by way of example for purposes of aiding in understanding the invention and may be placed at different locations as will be known to the person of ordinary skill in the art from the teachings herein. As just one example with respect to FIG. 2, the power sense 17, and/or voltage sense 26 may be located anywhere they can sense power on the hot conductors (hot being known in the art as having an electric potential to neutral or ground) and obtain a measure of loading of the system, for example they may be located at either the power connection (to power source 1) input 38 or power connection (to loads 7) output 39 of 40. Of course, somewhat different power measurements may result, however that may be desirable and taken into account in the practice of the invention. The location, 38 or 39 will give different readings because of the power lost in the circuitry of 40. For example, locating 17 and/or 26 at the power source 1 (or 29 of FIGS. 4 & 5) output, or the power input 38 will measure the timely power output from the power source. Locating 17 and/or 26 at or near the power output 39 will measure timely power output from the system. The former will provide overload protection from the power source 1 (or 29). The latter will provide some degree of protection for 1 and the inverter 15. Either may be used as desired. Of course, multiple power sense 17 and voltage sense circuits 26 may also be utilized if desired, e.g. for measuring the output of power source 1 (or 29) and also for measuring the input or output of the inverter 15. Or, power input at 38 and temperature of the inverter 15 may be measured, with both being used to determine the portion of the total available power being output or remaining available power for the temperature conditions.

FIG. 1 shows a diagram of a prior art auxiliary paralleling inverter AC power source 1 including an auxiliary power source 2, a paralleling inverter 3 receiving DC power 4 from the auxiliary power source 2, further sensing normal power 5 via circuit 6 and having a disconnect to disconnect the output of 3 from the auxiliary power output 8, FIG. 1 further showing the direction of power flow 10 when the auxiliary power source 2 can power the loads and has excess power to push into the normal power source 5 and direction of power flow 9 when there is not enough power from auxiliary power source 2 to power the loads.

FIG. 2 shows a diagram of an embodiment of a variable AC frequency reference 40 of the invention comprising a load responsive, power frequency control circuit which receives power from a paralleling inverter AC power source 1 at input 38 and provides power to various loads and associated load modules of 7 via contactor 13 and power output circuit(s) 39. Input 38 is preferred to compromise a standard male power connecter, for example a cable or panel mounted standard plug of locking or non-locking type suitable for the voltage and current output from the power source. Power output 39 may be one or more female cable or panel mounted standard socket of locking or non-locking type suitable for the voltage and current output for each output circuit of the power source. In the US and many foreign countries NEMA standard plugs and sockets having the number of circuits (including ground is desired) are preferred. Input 38 and/or output(s) 39 may also be hard wired, that is using lugs, terminals or other non-plug (socket) connections as will be known to the person of ordinary skill in the art from the teachings herein. In particular it is desired to use plugs, sockets and/or connections to match those used on the power source 1 (or 29) and the expected loads 7.

FIG. 2 further contains a power source load processor 19 which, if desired, may communicate with auxiliary paralleling inverter AC power source 1 via optional circuit 30, is responsive to; a power sense 17 via circuit 24, input power voltage from 38 via circuit 26, user input(s) from 36 via circuit 37, inverter information via circuit 27, and is powered by power supply 14 via circuit 22 which power supply 14 receives power via circuit 21 and converts the power to that needed to power processor 19 and via 19 to other circuitry, or directly from 14 to other circuitry as desired (e.g. low voltage DC supplied via connections which are not shown) and which may also receive load information via circuit 20 if desired and whereas the power source load processor 19 provides: a frequency reference to inverter 15 or alternatively control of a frequency reference in inverter 15 via circuit 18 connected to the control input of the inverter 15, display of information to a user via user display(s) 36 which communicates with 19 via 37, control for load shedding via circuit 20, control of contactor 13, control of power supply 14 if desired via circuit 22 with the inverter 15 of 40 further receiving power as needed from power supply 14 via circuit DC 4 (e.g. high voltage DC used by inverter 15 to generate variable frequency AC power), communicates with 14 via circuit 23 and provides a frequency-controlled reference power to the power source 1 via circuit 16.

FIG. 3 shows a diagram of an embodiment of a variable AC frequency reference 41 of the invention comprising a load responsive, power frequency control circuit, which receives power at input 38 from a paralleling inverter AC power source 1 and provides power to various loads and associated load modules of 7 via contactor 13 and power output 39 as in FIG. 2 and additionally showing power input from a normal power source 5, FIG. 3 further showing a diagram of an embodiment of a load responsive, power frequency control portion 41 of the invention which includes elements 13-24, 26, 27, 36-39 and DC 4 as in FIG. 2, a normal power sense circuit 11 which senses power from the normal power source 5 which is input at normal power in 9 and when the power does not meet necessary quality opens contactor 12 and provides power quality information to processor 19 via circuit 25, with processor 19 also communicating with power source 1 via optional circuit 30 if desired.

DETAILED DESCRIPTION OF THE INVENTION

Figure 4:
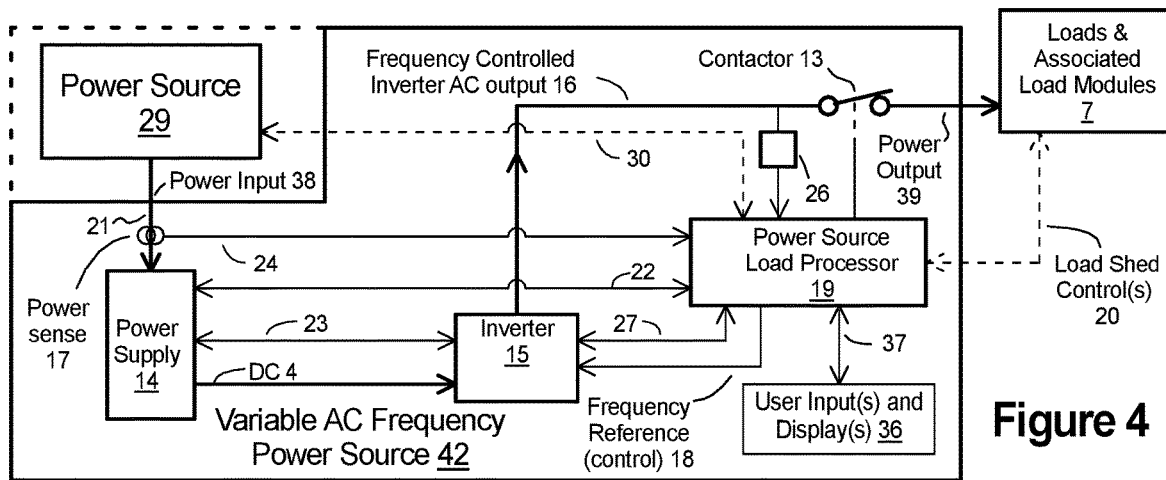
FIG. 4 is a diagram of an embodiment of a variable frequency power source 42 of the invention for receiving power from power source 29, which may be included as part of 42, or separate, with 42 providing AC power having a frequency which changes in a controlled fashion in response to the load presented thereto by loads and associated load modules of 7, the same as FIGS. 2 and 3 with 7 receiving power from 42 via a power output 39 and wherein 42 includes elements 13-24, 26, 27, 30, 36-39 and DC 4 as in FIG. 3.

The various improvements, advantages and features of the invention are described further below by way of additional details, explanations and examples which are non-limiting.

Embodiments of the invention so described herein by way of example comprise both power generation devices and methods and load management devices and methods comprising load modules and controllable loads. The invention is suitable for use in small power systems. Backup power systems are those which supply power when grid power fails to supply power (via the utility service connection) or is otherwise not providing power of sufficient quality. The inventive teachings may also be utilized for larger (than the defined small) power systems, that is, more than 440 volts or more than 400 amps as well as with systems that do not include a grid service connection.

Power grid is used herein in its common and ordinary meaning and refers to any commonly known and used sources of electrical power to homes and businesses, e.g. public and private electric utility companies. Power from power grids, or grid power as it is often referred to, is commonly supplied to a home, business or other customer of the utility company via a service entrance. Service entrances commonly include a revenue meter, a term of art for a meter which measures the quantity of watt-hours of power being consumed by the customer in order that the customer may be billed for that consumed power. Many revenue meters can also measure the rate of power consumption (usually in amps or watts). Service entrances are also designed to provide power at a maximum rate, for example 200, 320 or 400 amps and include circuit breakers which trip when this amount is exceeded to protect the utility equipment from damage.

Although not precisely scientifically accurate, rate can be thought of as how fast a water faucet fills a water bottle and the amount is the amount of water in the bottle. Similarly, and again not precisely accurate, with respect to the instant invention, for ease of understanding, the rate of power (e.g. watts or amps) can be thought of as the number of electrons per second that are flowing in a circuit whereas the amount of power (watt hours or amp hours) is the total number of electrons which have passed through a circuit. It should also be noted that persons of ordinary skill in the art to which the instant invention pertains, often speak these terms in a manner which requires knowledge of the context and particular device for understanding.

As just one example, a generator or other power source may be referred to by its size, the size being advertised by the manufacturer and might be a number like 5,000 watts. One might then think that the power source can provide 5,000 watts to various loads, however that probably isn't correct in that such manufacturers size the generator according to the maximum short term output it can provide to start an electric motor such as an air conditioning compressor and in reality the generator can only provide 3,500 watts on a steady basis. Further complicating matters, one might think that the generator's output circuit breaker would be designed to trip when the output power is more than 5,000 watts (or more than 3,500) watts and protect the generator. That too is not a good assumption. To prevent nuisance tripping the circuit breaker will most likely not trip until significantly higher short term and/or long term power is being provided. That in turn can cause the generator to output power which does not meet specifications (if any specifications are even given) or to be damaged before its output circuit breaker trips.

The instant invention may be utilized to control the loading of a power source, that is, to control the amount of power which the power source is outputting to its loads, and in particular to prevent overloading the power source, by managing connection and disconnection of one or more individual loads or group of loads. Overloads are generally undesirable in that they may cause deviations from power output specifications, loss of power, damage or combinations thereof. Overload, as used herein and in the claims, means a load that if not disconnected or otherwise prevented will either cause a departure from specifications for the power output from the power source, for example such as a deviation of AC power voltage or frequency for longer than a specified time period, a loss of power such as from a tripped circuit breaker, or damage such as overheating or exceeding mechanical stress limits.

It will be noted that most AC power generation inverters do not suffer from unintended AC power frequency drops with overloading as do internal combustion driven alternator type generators, a characteristic that is useful to the instant invention. On the other hand, overheating of an inverter can be a serious problem and can lead to the destruction of the electronic circuits therein. Many inverter circuits include internal temperature sensors and will shut down all power output if the electronic circuits get too hot. The present invention may utilize such temperature information in its operation to reduce the load on the inverter power source to keep temperatures below a known amount, and/or to reduce temperatures if the exceed a known amount.

In addition to internal temperature(s) of the power source, environmental conditions may also be taken into account by the instant invention, as just one example one or more of cooling air temperature, density and humidity may be utilized in respect controlling loads on a power source to prevent overloading. These and other parameters may be used by the invention to perform the control of loading of the power source. As used herein and in the claims, parameter means a quantity of one or more property or attribute (e.g. of a device, physical property, substance or environment) which is treated as a constant. A parameter may at times change or be adjusted.

Examples of parameters of interest herein include various horsepower, mechanical load, temperature, pressure (including altitude), humidity, power, wattage, voltage, current, including maximums, minimums, safe, starting, limited, instant, real time, near real time, and timely. Quantities pertaining to parameters may be in analog or digital form and expressed as numbers which are suitable for use by the device(s) using or responsive to such parameters.

The control of a power source output power may also be utilized to optimize the operation of the power source by increasing or limiting the output power to a particular level or range of levels to achieve a known purpose, e.g. to conserve power, keep the cost of power within a known range, to keep the rate of consumed power, or consumed fuel for generating power to a known amount or within a known range of amounts, to keep the amount of stored power or fuel to a known amount or within a known range of amounts.

Considerable teachings relating to details of controlling load connections to power sources in response to the loading (e.g. timely power output) and status of the power source are present in the above enumerated applications and U.S. Pat. No. 10,840,735 which teachings are incorporated herein by reference. These teachings are applicable to the instant invention. In particular the herein described control of the AC frequency of power output from one or more power sources in order to represent and convey information about the loading and/or status of the power source and the recovery of that information (e.g. by sensing or measurement of the AC power frequency) and use of that information by a controlled load, load module or to provide other control of loading of the power source by connecting, disconnecting and load limiting of individual loads and/or groups of loads will be known.

The use of load modules which include load limit modules and load switch modules may be utilized to control power which is supplied to the loads. Load limit module as used herein and in the claims is a module which is capable of limiting the current provided to the associated load to an amount greater than zero and less than an amount which the load is capable of consuming if connected directly to the power supplied by the power source. A load limit module may also include a switch to switch all power off, and the limiting may be adjustable to provide full power to the load. A light dimmer is an example of a load limit module which can control the amount of power provided to a light to be an amount greater than zero and less than the full amount the light is capable of consuming, thereby dimming the light. A light dimmer is also capable of switching all power to the light off, adjusting the amount of power provided (to vary the amount of light) and providing full power to the light. These operations are not required of a load limiter but one of more of them may be included. Similarly, load limiting is the action described above which is undertaken by a load limit module, that is, limiting the power to an amount greater than zero and less than the full amount.

In particular the load switching module switches full power to a load on and off, as for example a simple light switch does. Both types of load modules may include other circuitry and operations such as current, voltage, power factor and frequency sensing or measurement circuits, user inputs and outputs, processor circuits and other circuits sensors. In particular as related to the instant invention load modules may include a frequency sensor responsive to the frequency of the AC power input into the load module to provide some or all information about the power source which is conveyed by the AC frequency to a processor circuit in order that the processor circuit may control the power being supplied to the load.

As set out at MPEP 2164.08, (E9_R-10.2019) " . . . not everything necessary to practice the invention need be disclosed. In fact, what is well-known is best omitted." The explanation below for the Figures, and indeed other explanations herein, are given for the purpose of aiding the understanding of the instant invention. These descriptions and explanations often contain over simplifications, omissions of details and the like. These simplifications and omissions include not reciting considerable detail of circuitry which would tend to obscure the invention but those details will nevertheless be well known to the person of ordinary skill in the art from the teachings herein.

Figure 5:
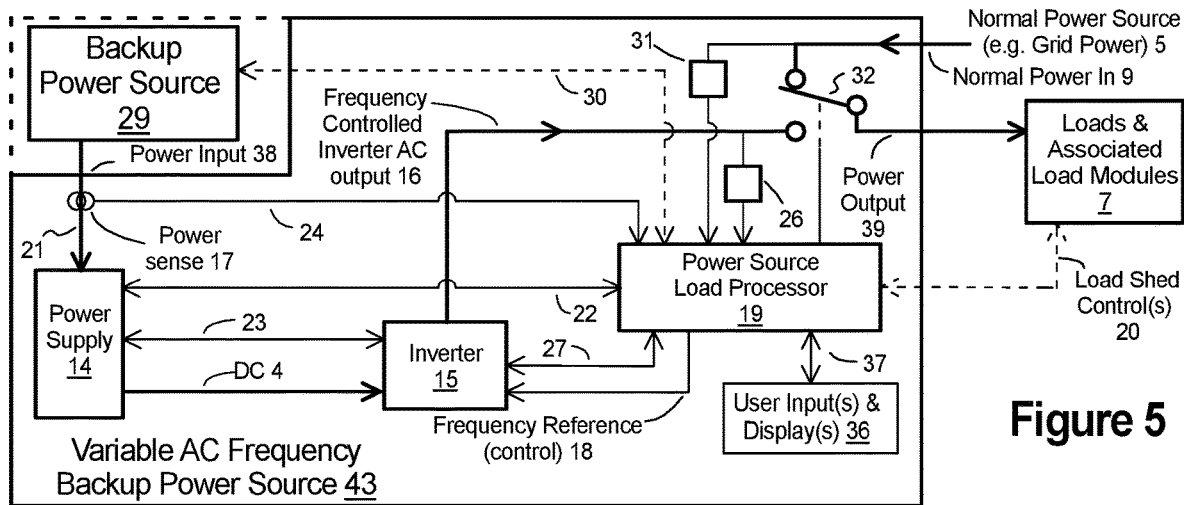
FIG. 5 is a diagram of an embodiment of a variable AC frequency backup power source 43 of the invention for providing backup AC power having a frequency which changes to known values in a controlled fashion in response to the load being presented thereto by loads and associated load modules of 7, similar to FIG. 4 with 7 receiving power from 43 via a transfer switch 32 which receives normal power source power 5 via input 9, the transfer switch 32 selecting normal power from 5 or frequency-controlled power from inverter 15 to be coupled to power output 39 and wherein 43 includes elements 14-24, 26, 27, 29, 30, 36-39 and DC 4 as in FIG. 4, with backup power source 29, which may be part of 43 or separate, with 29 being used for powering 7 when normal power source is missing or not of adequate quality and additional coupling of the input normal power source information to the processor via circuit 31.
Figure 6:
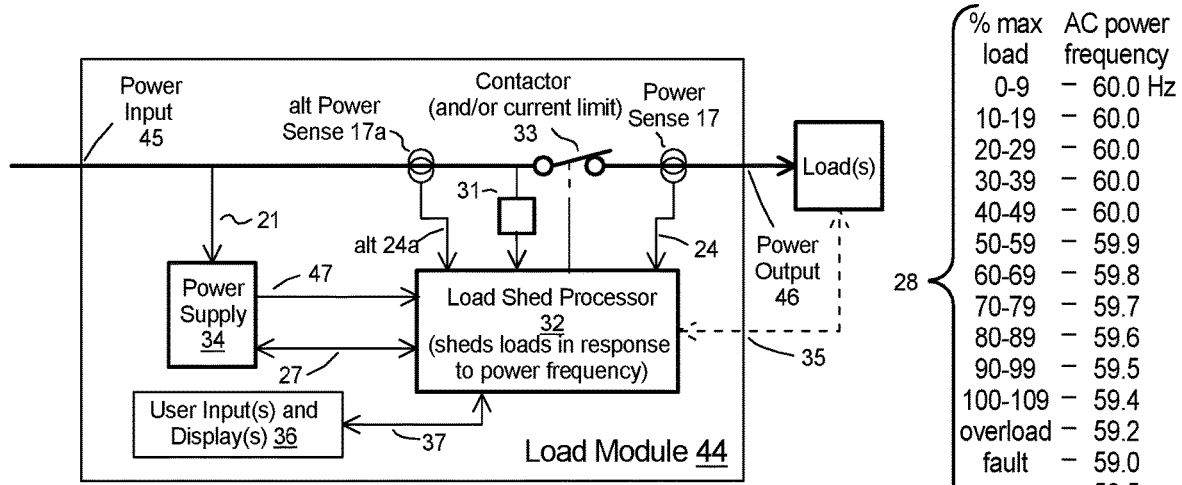
FIG. 6 is a diagram of an embodiment of a load module 44 of the invention controlling the power coupled to one or more loads, for example such as those of 7. Load module 44 receives AC power at power input 45, the frequency of the AC power being controllably changed to known values in response to the loading or output current of a power source, one possible examples of the controlled frequency to load relationship is shown by 28, the load module 44 having a load shed processor 32 receiving via 47 power to operate from power supply 34 which receives input power via 21, with 32 responsive to: power supply 34 via circuit 27, power sense 17 via circuit 24 and/or alternate power sense 17a and alternate circuit 24a, input power information via circuit 31, user input(s) from 36 which are coupled to 32 via circuit 37, load information via 35 if desired, with processor 32 operating to control at least; contactor (and/or a variable current circuit) 33 which outputs power to one or more loads via power output 46, load(s) via 35, power supply 34 via 27, processor 32 also operating to provide information to a user via display(s) 36 which communicates with 32 via 37.

Of particular interest in respect to the frequency control and measurement utilized in the instant invention, for the variable frequency reference circuits of FIGS. 2 and 3, the variable frequency power source of FIGS. 4 and 5 as well as for the load module of FIG. 6, are the current, voltage, power and frequency measurement. The measurement of power may be utilized, and for many power sources will be the preferred parameter, for determining the timely amount of power being output. Timely as used herein and in the claims means instant, real time, close to real time or a suitable time. In particular, timely voltage, current, wattage, power or other quantity or parameter will mean the quantity of, or value representing the quantity of, the parameter existing at a time which is suitable to be useful in the operation of the invention.

In respect to the determination of the timely power output of the power source (or any other timely power measurement, for example the power consumed by a load or group of loads) the aforementioned Atmel IC can provide such measurement in several types including voltage, current, active, reactive and apparent power (wattage) for fundamental and/or harmonics. The measurements may be in peak or RMS and may be for individual phases and all phase sums. The person of ordinary skill in the art will be able to choose and utilize one or more of these measurements of power to suit one or more particular desired level(s) of performance and capabilities to practice the invention in a given practice of the invention as will be known from the teachings herein. In particular, it may be desired that one or more of the particular measurements and/or calculations of power be available to be chosen by an installer or user via the user inputs 36 to provide a particular desired level(s) of performance and capabilities. As just one example of many possible selections which may be used if desired, peak or RMS values of voltage, current and/or power may be made available to be chosen.

As another example of the uses of the user input(s) and display(s) 36, the user may configure the display to display the AC power frequency, and/or the sensed power, during normal operation and during user testing. A user may test the variable AC frequency reference 40 (and 41, 42 & 43) and controllable loads and load modules by facilitating user control of the AC frequency. Such control is a novel feature of the invention and will be particularly useful in testing the ability of paralleling generators, controllable loads and load modules to track the range of frequencies which are used to convey output power amounts. Such testing is desirable because of the flexibility of the invention for use with a variety of power sources 1 and 29, and the ability if desired, to permit the user to configure both the number of and values of the AC power frequencies being used. This testing will ensure that a given power source, controllable load or load controller will properly respond to the desired ranges of frequencies. If desired this testing may be automatically performed by the processor 19 by setting known frequencies and monitoring the power source 1 or 19 as well as the output power at 39 to determine if the amount of frequency changes as expected and the amount of output power changes as expected. For example if 19 causes the frequency corresponding to be output from the inverter then the frequency of the power output 39 should be the same and the amount of power output from the power source should drop significantly.

Circuit elements shown in the instant Figures may be combined, individual elements divided, elements which are not wanted or needed eliminated. Additionally, elements may be added and elements rearranged in location and order of performance as will be known to the person of ordinary skill in the art from the teachings herein. All of these configurations and changes will be apparent to the person of ordinary skill in the art to practice a useful embodiment of the invention which achieves a desired level of performance and reliability at a desired cost in a particular application of the invention FIG. 1 shows a diagram of a prior art paralleling inverter AC power source 1 which can be used to provide 60 Hz AC power for both stationary and mobile use in North America, 50 Hz AC power in countries in other parts of the world. 400 Hz power for some aircraft, or A short explanation of the operation of paralleling inverter 3, with a few over simplifications for ease of understanding, will assist in understanding the present invention. Real world devices work in a considerably more complex manner; however, an understanding of these complexities is not necessary to understand the instant invention. A power source 2 such as an internal combustion engine DC generator (or alternator with rectifier), solar panel, wind turbine or storage battery array provides DC power 4 to a paralleling inverter circuit 3 which converts it to AC sine wave power which is output to various loads via the disconnect.

The paralleling inverter 1 is connected to normal power from a source 5, which is typically grid power, at the inverter AC power source output 8. In order for the paralleling inverter to send power to the loads, along with the grid power, it must output its sine wave power in the same phase and frequency as the grid power. The inverter power is said to be phase locked to the grid power. In order for the inverter 3 to achieve this phase lock, it must know what that phase and frequency is, so it senses the grid power, which is accomplished via a sense circuit 6. It is mentioned passing that while the various descriptions herein will assume that the paralleling inverter 3 frequency and phase locks precisely to the normal power from 5, in reality there are small phase shifts between the two due to power factor phase shifts between voltage and current, and additionally small phase differences are intentionally introduced to control the amount of power transferred from the inverter 3 to the normal power from 5. For ease of explanation, these small phase shifts will be ignored in the teachings herein. More importantly in respect to the instant invention, the frequency of the power output from inverter 3 is precisely the same as that of the normal power from 5.

To achieve proper operation the inverter 3 uses the disconnect to disconnect its power output from the grid power until it has phase locked its AC power generation to the grid power. If the inverter's AC power were to be connected to the grid power without being phase locked, very large amounts of current could flow from the grid into the inverter, causing substantial damage to the inverter. Once the inverter has phase locked its AC power output to the grid AC power, the inverter maintains that phase lock, and electronically gives a bit of priority to its power so that inverter power is used by the loads instead of grid power. If there isn't enough inverter power to power all of the loads, then the grid power is used to make up the shortage. However, if there is more than enough inverter power to power the loads then the excess inverter power ins sent into the grid, and the grid's utility pays the owner of the inverter power for that excess power. This is often referred to as net metering.

If for some reason the grid power is lost, for example because the utility shuts off the grid power in an emergency, then the inverter disconnects from the grid via the disconnect so as not to overload the inverter by trying to supply power to the entire grid. Additionally, the disconnect can be used to disconnect the inverter if it should be overloaded, overheat or experience some other problem. Some prior art inverters do have the ability to disconnect the grid and power the loads when the grid power is missing by using an internal frequency reference in order that 60 Hz power can still be provided. However, the inverter may not have the ability to power all of the loads. If the overload is small, the inverter generator may limit the output power, for example by limiting the output current or voltage (one affects the other) to keep the load(s) partially powered. If the overload goes away a very short time later the generator will return to full voltage output, however if the overload does not go away the inverter generator will likely overheat and shut off the output or otherwise will disconnect from the loads.

Importantly, many inverter AC power sources have the ability to phase lock to an external AC power such as grid power which is connected to its output, and phase lock and precisely track that power frequency. It is noted that grid power will typically operate with frequency variations which are very slow and usually no more than 1%, these variations being caused by large changes of the system wide loading on the grid. One such example is the widespread use of air conditioners during hot summer days. These frequency changes are kept to a minimum by changing the speed of rotation of the huge alternators which power companies use in water and steam powered power plants and is accomplished by sensing the AC frequency of the power being generated and controlling the flow of water or steam to the turbines which spin the alternators to keep the spinning, and thus the frequency of the power they are generating at the desired value. Not surprisingly, with alternators the size of a small house and weighing tons, speed changes to the spinning alternator from changing loads and correcting speed changes, happen very slowly unless there is a dramatic failure of the power grid. Inverters such as 3, being all electronic, are capable of much faster tracking of these grid power speed changes than the normal grid power's very small frequency change.

Additionally, when the auxiliary power source 2 of FIG. 1, which provides the power for some of the local loads when the normal power is not present, can easily track large load changes such as those created by connecting and disconnecting appliances. That is in part because a DC electricity storage device such as batteries and/or super capacitors (not shown) are incorporated in the system. The ultimate source of electricity such as a solar panel, wind turbine, or engine powered generator charges the storage device(s) and that stored electricity is used to "smooth out" sudden changes in the amount of current required by the inverter 3 to provide power to these changing loads. Additionally, the storage can operate to "smooth out" peaks and dips in the availability of power, as just one example of many, power is stored when bright sun shines on solar panels and some of that power is used when clouds hide the sun.

It should be kept in mind that in FIG. 1 the frequency of the power output from 1, whether or not normal power from 5 is present, will be substantially constant at the standard frequency being used (50 Hz., 60 Hz., or 400 Hz.). This frequency will be unaffected by the amount of power being output from 1. The frequency is steady even if that amount of power is very low, or approaching overload or creating an overload of aux power source 2. Consequently, many existing (although not prior art) frequency dependent load shed devices will not work with inverter power sources such as that of FIG. 1. This existing, frequency dependent load shed devices rely on the well-known slowing and corresponding power frequency drop which takes place with some types of internal combustion engine—alternator type power sources when overloaded. See e.g. the device of U.S. Pat. No. 10,069,331 and the description of this loading caused frequency drop (e.g. col. 1,ll. 39-54).

For example, some existing, although not prior art, devices operates to shed their load in response to the amount of frequency drop and the time that frequency drop is present. Suggested numbers for one such existing device used with standard 60 Hz power are a frequency drop of 2 Hz for 3.5 seconds and 8 Hz for 1 second. This type of load shed device will not work with inverter power sources which have steady output power frequency. It might also be noted here that the slowing and frequency drop of those types of internal combustion and alternator type power sources, is not controlled in any manner, other than to attempt to maintain the standard frequency when sufficient power is available from the internal combustion engine. Another problem which may occur with existing frequency dependent load shed devices is that several such identical devices may be utilized in a system. Thus, without some sort of differentiation of how and when the modules shed loads, they will all shed their load at the same time, even though only one or two loads need to be shed.

FIG. 2 shows a diagram of a variable AC frequency reference circuit 40 of the invention. The paralleling inverter AC power source 1, the same or similar to that of FIG. 1. Power storage may also be utilized, e.g. ones of batteries, supercapacitors, electro-mechanical devices and the like. The power storage may be part of the power source 1, part of 40 or separate. The power source 1 provides sine wave AC power which is paralleled (e.g. phase locked) to an external power reference frequency if one is present, or to an internal reference if there is no external reference. In this example, an external reference frequency is that of the AC power it is paralleled with, which in FIG. 1 is the normal power input from the normal power source 5, which is sensed by 6. In the embodiment of FIG. 2, the reference power 16 is provided by inverter 15. For purposes of explanation, 16 can be thought of as simulating grid power.

It will be understood that while an inverter type power source 1 is preferred for the several reasons discussed herein (e.g. light weight, economical operation, control of AC power frequency) the inventive concepts described herein will be useful with other types of paralleling AC power sources. In particular internal combustion engine and alternator type power sources which have the ability to accurately lock and control their power frequency to grid power or another power source, will benefit from the invention. Internal combustion and alternator power sources which incorporate electronic and electrical mechanical frequency control rather than solely mechanical control (e.g. such as mechanical governors) will find the inventive concepts herein beneficial.

Variable frequency reference 40 of FIG. 2 provides an AC power signal 16, which simulates the grid power which power source 1 would normally parallel to. Thus, the paralleling AC power source 1 which for example may be a prior art, self-contained, paralleling inverter generator, solar grid inverter, battery storage inverter or the aforementioned engine alternator power source, will phase lock to 16. This paralleling (phase and frequency locking) allows load processor 19 to control the frequency of the AC power provided by power source 1, and signal to the controlled loads and loads with associated load modules of 7 the degree or amount of loading on power source 1. It is noted here that because inverters use all electronic means to generate AC power, such devices have the advantage of quick and precise frequency control and thus it is expected that for many load shedding systems which utilize the present invention, inverters will be the preferred manner of creating the power output from power source 1, even if the underlying generation of power utilized by the inverter is provided by an internal combustion device, such as in portable inverter generators which incorporate both an internal combustion engine—generator and inverter.

The processor 19 may be an electronic circuit comprising one or more of: various discrete and integrated circuit (IC) components; a microprocessor; CPU (central processing unit); a gate array, such as an FPGA (field programmable gate array); a dedicated IC, such as an ASIC (application specific IC); a state machine; a PLC (programmable logic controller); PID (proportional-integral-derivative) controller, or any other electronic device(s), which along with their supporting circuitry, are suitable for providing the desired ones of the various operations set forth herein. Multiple devices and/or ones of each such chosen device can be utilized if desired, with each device operating to perform one or more task to implement a particular embodiment of the invention which achieves a desired degree of performance at a desired cost and complexity as will be known to the person of ordinary skill in the art from the teachings herein.

Using the variable frequency of the power output from 39, the various loads of 7 can then be shed if necessary, to prevent overloading power source 1 (and/or inverter 15) or alleviate an overload which is created by loads which cannot be shed, or shed all of the loads which can be shed in the event of a fault or emergency condition requiring immediate action. The ability to add load shedding capability to a prior art inverter power source 1, and in particular to prior art portable inverter generator power sources, without any modification thereof, is a valuable capability of the instant invention. This may be accomplished by use of the variable AC frequency reference 40 which controls the frequency of the power output from 1. It is envisioned that the invention of FIG. 2 may be practiced using a self-contained device 40, comprising a cable and plug for power input 38, the plug mating with a corresponding electrical socket on an existing portable paralleling inverter generator power source 1. The power output 39 of 40 may comprise one or more electrical sockets (which may be mounted in the case housing 40) with various extension cords, and/or load modules (FIG. 6) being plugged into those electrical sockets.

When a user pairs the variable AC frequency reference 40 with a desired power source 1, the user enters the maximum output power parameter of the power source 1 into the processor 19 via the user input(s). Processor 19 may communicate with power source 1 via optional circuit 30 and may receive the maximum output power parameter, as well as receiving operating information and providing commands thereby. Operating information may include power output, and other parameters, if used and available, some examples including temperature(s), lubricating oil level, fuel level, fuel consumption rate, battery charge (for starting and/or power storage), status etc. and thus make 17 and 26 redundant or unnecessary. It is noted that such communication via 30 may require modification of power source 1 if a suitable communications provisions are not already provided in 1 and further that such modification may be undesirable, particularly for practicing the invention with existing power sources which would need such modification. The input of the maximum output power parameter may be in any suitable type(s) of parameter and units as desired for a particular embodiment of the invention. Such parameter may for example be one or more of electrical power, internal temperature, ambient temperature. The maximum power parameter(s) will then be stored and used by the processor to determine from the amount of power being output as sensed by 17, a measure of the power being provided by power source 1 relative to its maximum power capability. That measure might be the remaining amount of available power (e.g. in units of amps or watts), or a percentage of maximum power being provided (e.g. in units of percent from 0 to 100), or a percentage of power which is still available (e.g. in units of percent from 0 to 100).

While power sense 17 is shown as sending power on the circuit from input 38 to output 39, this configuration is shown by way of example, and in particular the configuration avoids having to modify power source 1 to incorporate the power sensing therein. However, some power sources provide communications whereby the power is sensed internally and made available outside, for example via 30. Or, one of ordinary skill in the art may wish to construct or modify power source 1 to provide sensing such that power from the inverter does not need to travel from input 38 to output 39. In this configuration, the sense 17, output 39, contactor 13 and control may be eliminated with the loads 7 connected directly to the power output of the power source 1. This configuration may also be utilized for any of the embodiments shown in FIGS. 2-5, as used with paralleling power sources or otherwise where with appropriate modifications to allow power sensing in the power source, control of that power frequency, and connection of the loads in a more direct fashion to the power source. It may still be desirable to have the output power 16 from the inverter connect to the output of the power source 1 by the power connection used for the input 38 in order to receive power for the power supply 14 and sense the voltage and frequency of that power.

Alternatively, the processor 19 may just use the amount of power being provided (as measured by 17). The information, in desired type and units, is then utilized to cause the frequency of the output AC power 16 from inverter 15 to be a known amount which represents that particular amount of power. Power source 1 then parallels (phase locks) to 16 such that the power output from 39 of 40 has the desired frequency, that is the same frequency as 16. For an example of desired frequencies which correspond to amounts of output power, see 28 of FIG. 8. 28 is a chart of percentage of maximum load on the power source vs. the frequency which represents that percentage, or for some frequencies represents a range of percentages that the amount falls within. For example, if power source 1 is outputting 60 to 69 percent of the maximum available power, processor 19 controls the frequency of 16 to be 58.8 Hz. Other relationships between sensed amounts, events and frequencies will be known to the person of ordinary skill in the art from the teachings herein.

Other relationships with differing groupings and steps may be utilized as desired. It will be possible to use just two frequencies, the standard frequency (50 Hz., 60 Hz., or 400 Hz.) up to a threshold, which is preferred to be the manufacturer's maximum power specification for power source 1. The second frequency is a different overload frequency (e.g. 49 Hz., 59 Hz., or 399 Hz. depending on the standard being used) when the power output exceeds that maximum power specification (or another threshold if desired). Stated another way, the two frequencies can simply represent to load shed functions, the first controlled frequency is the standard frequency and the other controlled frequency (e.g. different than the standard frequency) is the start shedding frequency. The start shedding frequency may be activated in response to a single parameter such as a current measurement which shows the output current is at or above the manufacturer's maximum output current specification, or may be activated by one or more of various parameters or logic operations responsive to one or more parameters.

It is mentioned above that a threshold other than the maximum power specification may be utilized. This other threshold can be thought of as the maximum controlled load output power parameter for the power to be used to control the output power frequency. The maximum controlled load output power parameter may be used to reserve power for high priority loads, to protect system components other than or in addition to the power sources 1 or 29, or may be used for other purposes as will be apparent to the person of ordinary skill in the art from the teachings herein. If used, this parameter allows the devices of FIGS. 2-5 to control the output power frequency relative to the maximum amount of power which is to be used for controlling loads. It may, but does not have to, relate to or be, a maximum power output of the power source 1 or 29, a maximum power output of the inverter 15, a maximum power output to one or a group of loads or a manufacturer's output power parameter.

One application, of many possible, of the usefulness of the maximum controlled load output power parameter will be described here by way of example. If a small power system is used to power high priority loads and low priority loads, then it would be undesirable to shed the high priority loads. The high priority loads could then be connected directly to the output of power source 1 (or 29) and not be powered via the load shedding circuitry, e.g. not powered from outputs 39. By connecting those high priority loads directly to the power source, the power sense 17 will not sense power going to the high priority loads. Assuming the maximum power which can be drawn by these high priority loads is known, that amount of power can be subtracted from the maximum amount of power of the power source, with the remainder amount of power (that which is available to power lower priority loads) being stored in the processor 19 and used to control the power frequency. In that manner the processor will consider the lower priority loads to be overloading the power source at this lower amount of maximum controlled load output power parameter, which corresponds to, and is provided for, the lower priority loads. This amount of power will in overload the power source if the high priority loads are all being powered at that time.

In order to prevent shedding all of the possible loads upon receiving the (59.0 Hz) shed frequency, each load module and controlled load may be given a different priority and that priority determines how long to wait after receiving the load shed frequency before the load is shed. For example, the lowest priority load may be shed instantly, the next lowest priority shed after an amount of time it will take for the standard frequency to be received indicating that shedding the lowest priority load cured the overload condition. Each load in the priority chain will shed after an increased amount of time. The overall inventive operation is desired to shed only as many loads as are necessary to eliminate the overload condition, and even though all the loads are not instantly shed, the operation may very well be fast enough to protect the power source, particularly as compared some devices which may not shed loads for 3.5 seconds after the overload is detected, which detection may be some time after the overload started.

This two frequency embodiment differs significantly from the many prior art devices where the output power frequency drops to an uncontrolled amount in an uncontrolled fashion. The frequency drop is often not repeatable, and it quite often doesn't happen to an extent which can be recognized by a load control device until the output is at an unknown amount of power above, and an unknown time after, the power source overload is reached. Simply put, the present invention is a controlled and repeatable frequency which the output power quickly acquires as soon as the overload is reached (or jumped above) whereas the frequency of the prior art power source output is uncontrolled, is not set at the manufacturer's maximum power specification, does not happen quickly and cannot be detected quickly by a load module.

The inventive overload frequency taught herein may also be utilized to signal other situations, such as various faults and emergencies for which power needs to be lowered. As just one example of many situations where the overload frequency or another frequency can be used, is when one or more temperature thresholds is exceeded. The load modules controlling the power supplied to corresponding load(s) and the controllable loads, then measure this power frequency and operate to connect and disconnect the loads, preferably in a priority or other arrangement which will be discussed further herein below. The relationships between power output parameters and resulting frequency may be programmed into 19 via user input 36 if desired. In the case of using frequency to represent the amount of output power (watts or amps), the controlled loads and load modules can be programmed to know the maximum amount the power source 1 can provide.

The frequency control reference 16 causes the power source 1 to lock its frequency and phase, to the frequency and phase of the reference power 16. This phase locking by 1 operates in the same manner as it would frequency and phase lock to a grid power source. This allows the power source load processor 19 of 40 to control the frequency of the power output from 1, that frequency being a measure of the amount of loading (power output) of 1. That power in turn is coupled via contactor 13 to the various loads and load modules of 7 which are to be powered with variable frequency AC power, where that frequency represents the amount of load or a range of amounts of load on the power source 1. It will be appreciated from the teachings herein that the contactor 13, as well as contactors 12 and 33, may be of any type commonly used in the art for switching power, for example, mechanical, solid state, various form factors, latching and the like.

In this fashion, the loads of 7 can be connected and disconnected individually or in groups to prevent overloading the power source 1 while maximizing the number of loads which are being powered. As a simple example, assuming the normal output frequency of power from 1 is 60 Hz, as controlled by 19. When 19 senses, via 17 and 26 that the power output of 1 is nearing or at its maximum capability (or at or within some other amount relative to the maximum capability), that maximum capability having been previously stored in 19 when it was installed with or otherwise mated to 1, then 19 causes the output power of 1 to change from 60 Hz to 58 Hz. It may be noted that as most inverter generators approach and reach the maximum current output, they will enter a current limiting mode which causes the voltage, which can be sensed by 26, to drop. That voltage drop is preferred to be used in conjunction with the power sense from 17 in determining the maximum output power, or very simply that when a voltage drop below a threshold amount occurs the maximum output has been reached. In addition, in some embodiments of the invention the contactors 13 and 33 may comprise current limiting or variable current control in addition to simple on/off operation. In this fashion the load shedding may limit the amount of output current provided from 39 to prevent or alleviate overloading the power source 1 (or 29) and/or inverter 15, and in particular may continue to limit the current supplied of he load(s) to stop the current limiting in the power source 1.

Upon sensing the 58 Hz frequency of the incoming power, one or more of the controlled loads and/or load modules of 7 operate one at a time in a sequence of their assigned priority, to stop consuming power, that is, to disconnect from the power output from 39. For example, the lowest priority load which is connected disconnects immediately upon sensing the 58 Hz power. Two seconds (or any other desired time) later the next lowest priority load disconnects, and so forth. The loads will continue to disconnect, in lowest to highest priority, until the power frequency returns to 60 Hz. Load processor 19 senses that the power output of power source 1 has started dropping as soon as the first (lowest priority) connected load disconnects. When the power output from power source 1 drops below a known level or to within a known range, the load processor 19 returns the power frequency to 60 Hz, and the various loads which are still connected stop disconnecting. Thereafter, after a time period which may be different for each load, the loads start to reconnect, one at a time, starting with the highest priority load which is not currently connected. Each controllable load and load module of 7 may be programmed with one or more of a priority, a delay time for disconnecting and a delay time for reconnecting as will be taught below in more detail with respect to FIG. 6.

The variable AC frequency reference 40 comprises a power supply 14 which receives power from the power source 1 via 21 and provides DC power to operate the power source load processor and other electronics 19, and also provides DC power to the inverter 15 from which the variable AC frequency reference power 16 is made. Power source load processor 19 contains stored information about the power source 1, including its maximum output power capability. This information can be provided to the processor via a user input 36, the information being stored for use by 19. This information may be automatically updated from additional sensors (not shown) or via the user input 36. If desired, 19 (or 36) may include a wired or wireless interface to allow performing various capabilities via other systems and devices, for example via a smart phone or via the Internet.

Just two of several examples of such parameters are the altitude and ambient temperature which may affect the maximum output power capability of the power source. These parameters may be sensed by 40 (sensors not shown) or may be manually or automatically input via the user input 36 or in response to a communications link (not shown) to a remotely located automatic control. Internet connection may be utilized to allow updating of the various elements such as 19, remote troubleshooting, remote reporting of status and operation and remote control. The ambient temperature and altitude will of particular use in that they may directly affect the maximum power capability. Additionally, 19 receives information about the power being output by power source 1 via 24 from a power sense circuit 17. Power sense 17 may for example be a current transformer or a current shunt, a non-contact voltage and current measurement device, or a power measurement IC that computes one or more of power and other parameters from current and voltage sensors.

Load processor 19 is responsive to the output power parameters determined by 17 and the stored maximum output power of the power source 1, which may be adjusted in response to operating conditions, to determine a measure of loading on the power source 1 and provide a control signal via 18 to the inverter 15 which uses that signal to control the frequency of the control reference 16 for the paralleling inverter. 19 may provide the control signal via 18 which controls a frequency reference which is part of 15, or may provide a clock or other type signal which has a frequency, for example a sine wave at the desired frequency of 16. Thus, the frequency reference may be located in 15 or 19 as desired and may be an NCO (numerically controlled oscillator) or other type of frequency reference which will be known to the person of ordinary skill in the art to be suitable for the operation of 15 from the teachings herein. The frequency of the reference 18 is preferred to be set to a known frequency which represents the loading and thus via 16 and the paralleling action of power source 1, the frequency of the AC power output from 1 is that which represents the amount of loading on 1. For example, if power source 1 is only loaded to less than 50% of its maximum capacity, then the output frequency would be set to 60 Hz. The frequency would be change by 0.1 Hz for every 10% increase in loading until at 100% load the frequency would be 59.4 Hz. See 28 of FIG. 6. Other frequency combinations, stepped, linear and non-linear, may be used if desired.

The use of several steps to indicate power output is useful to assist in load shedding to prevent overloads, and in particular to permit shedding lower priority loads as the output power increases. For example, the lowest priority load may be shed when the output power reaches 70% of maximum, the next priority load shed if the output continues to increase (or both are shed if the output jumps) to 80%, the next two are shed if the output continues to increase (or all four are shed if the output jumps) to 90%. If however the lowest priority load is shed when the output reaches 70% and the output power drops by a known amount, for example by 6%, the lowest priority load can be reconnected when the output power drops further, for example to 60%. Which this load shedding operation is not as accurate, and in particular does not select an optimum load to shed, as described in the priority applications, it nevertheless will provide good protection from overloading.

Additionally, frequency shift keying and other methods of conveying information via the power frequency will be known to persons of ordinary skill in the art from the teachings herein. These methods may also be used with, or used in place of, that of 28, if desired. The methods may send additional data and information instead of just loading. If desired the control of power frequency may be utilized to convey data which is unrelated to the load shedding operation, or even unrelated to the power generation. As just a few of several examples, when the power source is providing power below 50% of maximum, the frequency may shift from 60.0 Hz to 60.05 for one second every 5 seconds to signify that power source is supplying power. The level of fuel, lubricating oil, operating hours, filter age and hours and other desired engine related information may be conveyed as well as environmental conditions such as temperature, humidity, sky conditions, daylight intensity, wind and amount of power storage.

Frequency shifts, as well as the other frequency changes, may be made in a somewhat instantaneous or jumping fashion, or the transition between different frequencies may be performed in a slower fashion, slewing from one frequency to another over a short period of time. For example, the above shift from 60.0 Hz to 60.05 Hz may be done by ramping up over 0.5 seconds, holding at 60.5 Hz for one second and then ramping back down to 60.0 Hz over 0.5 seconds. These frequency differences, although small, can be recognized and utilized to control loads and to provide information about the operation of the power source because of the ability of the power inverter to precisely control power frequency.

Power source load processor 19 may further respond to the voltage of input power at 38 via sense circuit 26, and if desired the frequency of the input power. This allows 19 to confirm that the expected voltage and frequency is present, confirm that power source 1 is correctly paralleling frequency control reference power 16, and in conjunction with power sense 17 can determine the power factor (the phase between the current and voltage) and other parameters of power being delivered to the loads. In particular, power sense 17 may be a power metering IC capable of determining and calculating numerous parameters as will be discussed further below.

It will be appreciated by the person of ordinary skill in the art that while this preferred embodiment shows separate current and voltage sensing 17 and 26 respectively, that numerous different arrangements may be resorted to in order to measure characteristics of the power being delivered by the power source 1 in order to meet a particular level of performance and cost as desired. As one example, the power supply 14 may include a step-down voltage transformer to provide power 22 to the load processor 19 and the voltage output of that transformer may be measured, either peak to peak or RMS, in order to know or infer the voltage being output by 1. Other circuit elements may receive power via 22 and 19 if desired or 14 may provide power directly to one or more other circuit elements as needed (circuits not shown) which for circuit design preferences do not receive power via 19. In particular, AC or DC power for the coil of contactor 13 may be provided by 14 and that power switched by processor 19 to operate contactor 13. Or, the coil of contactor 13 may utilize the same power as that input at 38 (or one of the phases thereof) the power being switched by 19 to operate 13.

Additionally, the power source load processor 19 may communicate with the power supply 14 via 22, with the inverter 15 via 27, operate to display information to, and receive information from, a user via 36 and if desired communicate with one or more of the loads and associated load modules of 7 via 20. It is envisioned that loads which are physically located some distance from 40 may be controlled to be shed and connected in response to power frequency, and loads which are close by 40 could be controlled in response to power frequency or via wired or wireless communications channels. In that manner, loads which vary in power consumption can provide power consumption feedback to 19. Of course, the logistics of selection of frequency or another form of communications must be dealt with but can be easily done by the person of ordinary skill in the art from the teachings herein. Just a few of the communication items that 19 may utilize include receiving temperatures and other operating conditions from 14 and 15, providing commands such as turn on and off, perform fault analysis and the like from 14 and 15. Additionally the load processor 19 operates to control the contactor 13, which may be a current limit circuit if desired, in order to disconnect the loads and associated load modules of 7 in the event such is needed to start the operation of 40 with the power source 1, or in the event of a fault or desired shutdown.

Alternatively, power consumption by one or more loads may be determined by monitoring the change in total power as determined from 17, as individual loads turn on and off. If the approximate power the load consumes is known, or the power it consumed the last time it turned on or off, when the total power from 17 changes by approximately that amount, it can be reasoned that it was that load which is (or was) drawing that amount of power. A simple example is an air conditioning compressor. That compressor may draw a starting current of 48 amps for three seconds, followed by a steady current consumption of 24 amps. If there are no other loads with similar characteristics in the system, then when a current pattern matching or near those amounts is determined via 17, then it is logical to assume that those new numbers are those of the compressor. That new current may be stored by 19 and utilized for various purposes. For example, a user may access the compressor starting an running currents in order to set the priority or enter other information in a load module (FIG. 6) for that compressor.

Of particular interest with respect to voltage and current sensing are metering integrated circuits which combine many functions and capabilities related to measuring and determining the amount and quality of power which is flowing in a single or multiple phase circuit. One of many such ICs which are available is the Atmel M90E32AS Enhanced Poly-Phase High-Performance Wide-Span Energy Metering IC available from Atmel Corporation, 1600 Technology Drive, San Jose, CA 95110 USA. This high accuracy IC includes various inputs, internal processing, calculating circuitry, and digital outputs. These IC elements include input analog to digital converters, a digital signal processor, control logic, alarms and warnings, and provides several measurement functions and calculations in a single package with minimal additional circuit elements required.

Those IC elements including a crystal oscillator which is used, among other uses, for frequency measurements of the AC power being monitored. Accordingly, the precision of the frequency measurements is related directly to the crystal and the desired accuracy vs. cost may be chosen to meet a particular desired capability in the practice of the invention. However, with a suitable crystal accuracy, the frequency measurement accuracy is in the order of 0.01 Hz. By measuring the power output frequency with this accuracy, the processor 19 will be able to ensure that output frequency is being controlled to similar accuracies and if not to include a correction factor in the frequency of reference 16 if a clock in the processor is used to set the frequency of the reference 16. Similar measurement and corrections may be utilized throughout the system for example to provide frequency measurements and corrections to the load shed processor 32 of FIG. 6. By way of explanation, assume the frequency to load relationship of 28 is being used and it is expected that there will be extended periods of time when 60.0 Hz is being output from 40. If the load shed processor 32 of a first load module 44 is measuring 60.18 Hz, a correction factor may be developed and used to correct the error of 0.18 Hz. If the processor 32 of a second load module 44 is measuring 59.92 Hz, a correction factor of −0.08 may be developed and used to correct the error.

The Atmel IC's digital outputs include an SPI interface for operating with a host controller, such as the Load Processor 19 of FIGS. 2-5 and the Load Shed Processor 32 of FIG. 6. The measurement functions of the Atmel IC include the following: active/reactive/apparent power, per-phase apparent power, fundamental/harmonic active power, power factor, fundamental/harmonic active power, mean power factor, voltage/current rms, neutral line current, phase angle, frequency, temperature and peak value. Most of these measurements and calculations are available per phase and as an all phase sum. By mounting the IC in thermal proximity to the Inverter 15, for example in the flow of cooling air leaving the inverter, the IC's temperature sensor can operate to provide a measure of heating on that circuit. And, the individual power sense 17 and voltage sense 26 can simply be one or more passive current transformers or shunts and voltage dividing resistors.

FIG. 3 shows 41, a diagram of the variable AC frequency reference as used with a normal power source 5, which may be a grid power source, input at normal power input 9 in order to permit net metering operation by power source 1 paralleling the normal power source 5 when it is providing acceptable power, and to operate as a backup power source with variable AC frequency power for load control when normal power source 5 is not present or is not providing acceptable power. Variable AC frequency reference 41 operates the same as 40 when there is no normal power present, with the additional operation of normal power sense 11 sensing the loss of unacceptable quality of normal power and opening contactor 12. In this condition that information is made available to 19 via 25, and 19 operates as in 40.

The variable AC frequency reference 41 operating under control of processor 19 in conjunction with the power source 1 may have at least three modes of operation for outputting power at 39 to loads 7. In the first mode controller 19 idles the inverter 15 thereby preventing it from putting out any power (and present a high impedance to not draw any power. Controller 19 also idles the power source 1 (e.g. via 30) to prevent it from outputting any power (and present a high impedance). In this fashion normal power alone powers the loads 7. The second mode being as a grid tie inverter which may be utilized for net metering. Here, the inverter 15 is again idled, but the power source 1 is allowed to parallel the normal power and operate as a grid tie inverter. The third mode is utilized with the normal power is missing or not of acceptable quality. The power source 1 operates as an islanding inverter having controlled variable AC frequency power usable for load shedding to prevent overloading of the power source. The embodiment of FIG. 3, as well as the others, may also be used along with power storage, e.g. batteries, supercapacitors and various electro-mechanical devices which may be part of the power source 1, part of 41 or separate.

As in FIG. 2, if desired, additional circuit 30 between power source 1 and load processor 19 may be included and be used to provide status of the power source 1 to the processor 19 and allow the processor 19 to control the power source. For example, operating parameters, e.g. temperature, available fuel, battery charge (for a starting battery and/or power storage battery, if utilized), environmental conditions and fault conditions to name just a few, can be communicated to 19. Processor 19 may also control the power source 1, e.g. to turn it on and off, control battery charging, reset various alarms and fault indications, among many others which are possible and desired based on the particular power source 1. As with FIG. 2, the use of optional circuit 30 may not be desirable, particularly with existing power source devices which would have to be modified.

If the power source is not needed for net metering operation, it may be desired to be started by 19 when the normal power source fails. It is noted that power supply 14 may also have a connection (not shown) to receive power from the normal power source 5 via the input (non-swinger) side of contactor 12 in order that 14 may supply power to the various circuit elements (e.g. low voltage DC power supplied via circuits (not shown) and AC or DC power to operate contactors 12 and/or 13). Power supply 14 may also include power storage to enable it to provide power to circuit elements of 41 to facilitate startup of 41 when there is no power available from either 5 or 1.

Power source 1 may provide information such as temperature, faults, fuel level or output power level to 19, the latter eliminating the need for 17 and 26. When acceptable normal power is available sense circuit 11 provides that information to 19 which in turn causes the inverter 15 to shut down which enables power source 1 to parallel the normal power in its normal fashion. If desired 19 can monitor the load on power source 1 via 17 and control one or more loads and associated load modules of 7 via load shed controls 20 to facilitate net metering operation. One operation, if desired, is disconnecting low priority loads during peak billing times and the like. As with the invention embodiment of FIG. 2, the ability to use the variable AC frequency reference 41 of FIG. 3 to enable controlled frequency-based load shedding when the prior art power source 1 is operating as a backup in the absence if adequate power from the normal power source 5, is a useful capability of the invention.

Thus, the embodiment of FIG. 3 operates to provide grid tie operation in order to use power from power source 1 to provide power to loads 7 thereby reducing the amount of normal (e.g. grid) power which is needed. If there is excess power from power source 1 which is not needed to supply loads 7, that power will be sent into the grid for net metering operation thereby selling that excess power to the power company. In the event the normal power fails or otherwise does not have suitable quality, the system is isolated from the grid (by opening contactor 12) and the system operates as a backup power source with load shedding capability as described herein, utilizing variable AC frequency control of the power output from 39.

FIG. 4 shows a diagram of a variable AC frequency power source 42 which includes a power source 29 and in particular 29 may be one or more of those power sources which include solar, wind, water, geothermal and internal combustion power generation. The embodiment of FIG. 4 as well as the others, may also be used along with power storage, e.g. one or more of batteries, supercapacitors and various electro-mechanical devices which may be part of the power source 29, part of 42 or separate. The operation of 14 (including power connections and storage), 15, 17, 19, 26, 36 and the various interconnections are the same as that described for those elements in FIGS. 2 and 3. It will be understood however that these elements may be modified as desired to facilitate use in 42 as will be apparent to the person of ordinary skill in the art from the teachings herein. It will be known that if power source 29 outputs power which is suitable for use by inverter 15 (e.g. DC 4) power from 29 may be coupled directly to inverter 15 in 42 (and the other embodiments). Power supply 14 will only be need to supply power to the other circuit elements.

The configuration of FIG. 4, used with DC power sources, is well suited to stationary applications such as with solar, wind, water, geothermal and stationary (i.e. non-portable) internal combustion power generation. The variable AC frequency power source 42 may be located physically near, physically attached to or within the same enclosure as 29, or may be physically separated, particularly for solar panel installations which are mounted on the roof of a building and wind turbines which are mounted outdoors. The power source 29 may connect to the power supply 14 via individual cables which make the connection to 29 via a socket, lugs, terminals or the like as is well known in the art. The power sense 17 may be located on the individual hot cables physically near to 14 to sense the amount of power being output from 29 (and input to 14).

The power source 29 may however provide AC power along with an appropriate rectifier circuit, the rectifier circuit being located with or in the power source 29 or with or in the power supply 14. In particular a power source 29 utilizing an internal combustion engine power source and supplying AC power (e.g. from an alternator or inverter) via one or more panel mounted sockets suitable for the voltage and current being provided, may be utilized with 42. The input connection 21 may be a cable extending from the power input 39, between the enclosure of 42 to the socket of 29, the cable having a mating plug to allow it to be plugged into the socket of 29. Inside the enclosure of 42 the cable may transition, or be connected by lugs, terminals or the like, to individual cables to connect to power supply 14. The power sense 17 may then be located to sense the amount of power flowing in individual hot cables being output from 29 (and input to 14). The embodiment of FIG. 4 is also well suited to portable applications where the power source 29 is a portable power source which is connected to the power supply 14 via 21 utilizing a plug and socket combination as taught above. The variable AC frequency power source 42 may then be enclosed in its own portable housing with one or more power socket which the loads 7 may be connected to.

The embodiment of FIG. 4, when utilized as a portable inverter generator with the power source 29, is preferred to be mechanically configured within the enclosure of 42 (or vice versa), e.g. 29 and 42 are contained in a common enclosure and provides similar benefits as those portable inverter generator devices which are currently being sold. Such benefits include e.g. low noise, low weight and high efficiency to name a few. In addition, and unlike the prior art portable inverter generator devices currently being sold (without the invention), the portable version of FIG. 4 has the ability to support controlled frequency-based load shedding. This ability is desirable for such applications as vehicles like motor homes and live in watercraft, as well as portable operations where any load shedding would otherwise require communications with wired, wireless and PLC communications. It is envisioned that a portable device such as that of FIG. 4 can be used with multiple extension cords and load modules to provide a portable power system which will automatically connect and disconnect loads according to priority (e.g. lowest priority disconnected first and reconnect last) to prevent overloading the power source.

It is mentioned here that the present invention, by using an inverter (as compared to an alternator) will very quickly respond to the need for load shedding, the new output power measurement after the first (lowest priority) load is shed will be very fast and thus shedding the necessary number of loads may be accomplished very quickly as compared to an internal combustion engine and alternator combination. This is particularly true when compared to a power source where the output power frequency is poorly controlled, such as that described above in the '331 patent. And the controlled frequency load shed of the present invention is much faster than some existing frequency-based load shed devices which operate with uncontrolled frequency drops. Because of the speed of the invention, it will more quickly, accurately and reliably maintain the output power of the power source below the manufacturer's maximum output specification. This performance can be achieved without unnecessarily shedding all of the loads.

In a portable embodiment of FIG. 4, the processor 19 is preferred to determine, directly via a power sense circuit 17 or, if desired, via communications with the power source 29 such as via optional circuit 30, the amount of power being provided by the power source 29. As with FIG. 2, the use of circuit 30 may not be desirable, particularly with existing power source devices which would have to be modified. The amount of power may be determined simply by measurement with 17, or within 29 by measurement of power being used in critical circuits, and may also include determination of other factors as previously discussed. The temperature of one or more of the power source 29, the inverter 15 and/or the power supply 14 are just a few examples of parameters which may be determined and taken into account.

The invention of FIG. 4 may be used in a mechanical and electrical configuration, stationary or portable, with a desired one or more types of power source 29 which is suitable for a desired application. Power storage may be incorporated as taught above and further may incorporate separate storage for separate uses. For example, a first storage may be utilized for start-up operation such as powering the electronic circuitry of 43 (including that of 29). A second storage may be utilized for providing DC 4 power to the inverter 15 which is used to generate the frequency-controlled AC output power 16.

FIG. 5 shows a diagram of a variable AC Frequency backup power source 43 which is similar to 40, 41 and 42 but includes a transfer switch 32. Transfer switch 32 receives power from a normal power source 5, such as grid power, at its normal power terminals via normal power input 9. Frequency-controlled backup power 16 is coupled from the inverter 15 to the backup power terminals of the transfer switch 32, the transfer switch selecting backup power from 15 or normal power from 38 to power the loads and associated load modules of 7. The operations of 14, 15, 17, 19, 26, 36 and the various interconnections are the same as that described for those elements in FIGS. 2-4. It will be understood however that they may be modified to facilitate use in 43 as will be apparent to the person of ordinary skill in the art from the teachings herein. FIG. 5, similar to FIG. 3, may have three modes of operation under control of processor 19 if desired. The first mode is with only normal power providing power to the loads 7 and power source 29 and inverter 15 idled. The second mode is with normal power powering the loads 7 and with power source 29 operating with inverter 15 to parallel the normal power, processor 19 operating to receive normal power via 31 and in response to the frequency of the normal power, provide the frequency reference 18 to the inverter. This allows inverter 15 to parallel the normal power and to thereby operate in a net metering fashion. The third mode is power source 29 and variable AC frequency backup power source 43 operating as a controlled variable AC frequency backup power source when normal power is not of sufficient quality.

The transfer switch 32 is shown as being controlled by 19 in response to information about the input normal power provided from 5 via power input 9, the information being provided by circuit 31. When the input normal power is of sufficient quality the transfer switch is controlled by 19 to select normal power to power 7. When normal power 5 is selected, the output of inverter 15 may be connected to the normal power input 9 or the power output 39 (connections not shown) to parallel the normal power for net metering operation. Further, if desired the control of the transfer switch 32 may be provided by separate circuitry for monitoring the quality of normal power input at 9, such as shown by 11 of FIG. 3. A combination of controls may also be utilized, with a circuit such as 11 operating to determine when normal power is not of sufficient quality and circuit 19 operating to determine when inverter power 16 is present and ready to be connected to 7.

When the input normal power is not of sufficient quality the transfer switch is controlled by 19 (or by alternative circuitry for example such as 11) to select frequency-controlled inverter power from 15, when the inverter power is present and ready for connection as determined by 19 in response to inverter power information supplied via circuit 26 (or alternatively via 27). It is noted that while the power supply 14 is shown as receiving power from backup source 29 and providing operating power to various circuit elements (connections not shown), power supply 14 may also receive normal power from 5 when the backup power source 29 is not in use. As with the above embodiments, the power source 29 of 43 may include power storage which may incorporate separate storage for separate uses. For example, a first storage may be utilized for start-up operation such as powering the electronic circuitry of 43 (and if desired that of 29). A second storage may be utilized for providing DC 4 power to the inverter 15 which is used to generate the frequency-controlled AC output power 16 which is used for backup power when the normal power source 5 is not present or of sufficient quality. A third storage may be utilized for providing DC 4 power to the inverter 15 which is used to generate the frequency-controlled AC output power 16 which is used for paralleling the normal power source 5 for net metering operation.

Thus, the variable AC frequency reference 43 operating in conjunction with the backup power source 29 and the transfer switch 32 may have three modes of operation for outputting power to loads at 39, the first mode being as a normal operation powering of loads 7 using the normal power source 5, the second mode is for normal power while utilizing inverter 15 paralleled with normal power for net metering operation and the third mode as a backup power inverter having controlled AC frequency power usable for load shedding to prevent overloading of the power source. One of ordinary skill in the art will recognize that if net metering is desired, this is very similar to the operation described with respect to 41 of FIG. 3 and may utilize two contactors such as 12 and 13 instead of transfer switch 32.

FIG. 6 shows a diagram of a load module 44 which is preferred to operate with controlled variable frequency power, the frequency of which is controlled to represent a known amount of power being supplied by its source, for example such as that provided by the devices of FIGS. 2-5. It will be noted that load module 44 may be configured in a self-contained fashion, with all of the components and circuits thereof mounted in a NEMA rated enclosure. The NEMA rating may be for indoor or outdoor use as desired. In particular, the use of an outdoor rated enclosure will be useful to allow the module to operate with portable inverter generators which are used for providing power in various outdoor locations, camp sites, parking lots, and construction sites to name a few. It will be understood that if desired, the load module 44 of FIG. 6 may also operate with engine—alternator devices in which the engine will slow uncontrollably when overloaded, thus causing the frequency of the output power to drop by an amount which is unrelated to the output power, other than the fact that that amount of power causes an overload. While the operation with the engine—alternator type power source will not benefit from the inventive features and advantages of using controlled frequency power, it will nevertheless provide some degree of protection for the power source.

In particular, for portable operation, the power input 45 may comprise a suitably rated cable (e.g. type W such as SOOW) with a suitable male plug with or without a waterproof rating (e.g. NEMA rating). The plug having a desired number of circuits and wire size and configuration to mate with the portable inverter generator or an extension cord plugged into the portable inverter generator. The power output may also comprise one or more a suitably rated wires, cable(s), conduit(s), raceway(s) and female socket(s) to provide power to the load or loads. Of particular use, a plug for input 45 and one or more sockets for output 46 may be mounted in the enclosure, with or without waterproof protection and rating. Alternatively, load module 44 may be configured for permanent installation with the power input 45 comprising suitably rated wires, wire lugs, terminals or other wire connections, and provisions for accommodating conduit, wire raceway or the like for permanent installation. Similarly, the output 46 may comprise suitably rated wires, wire lugs, terminals or other wire connections, and provisions for accommodating conduit, wire raceway or the like.

While in FIG. 6 the control of the load(s) is via a separate load module 44, it will be understood that the circuitry which is utilized for this control may be incorporated into the load itself, thus providing a controllable load as mentioned elsewhere herein. FIG. 6 shows a power input 45 at which the frequency-controlled AC power output from one of the variable AC frequency devices taught herein with respect to FIGS. 2-5 is coupled. The input power from 45 in coupled to a power supply 34 which provides power via 47 to power the load shed processor 32 and via 32 to the other circuit elements. If desired 34 may provide power to one or more other circuit elements as needed (circuits not shown) which for circuit design preferences do not receive power via 32.

In a simplified description of operation, the processor is responsive to the frequency of the power input at 45, via 31 or directly (not shown) to determine that frequency and the corresponding amount of output power being output from the power source providing that power. The frequency determination may be done by simply counting clock cycles from one zero crossing to a later one, dividing the count by the number of corresponding power cycles (known from the zero crossings) to obtain the number of clocks per power cycle, multiplying that number of clocks per cycle by the period of one clock cycle to obtain the period of the power cycle, and inverting the period of a power cycle to obtain its frequency.

Other operations may be performed as well in order to improve performance;
preconditioning or filtering the AC power before determining zero crossings to reduce noise and phase jitter, using averaging of the count or determined frequency, discarding outlier data and using statistical analysis being some of the many possible operations which the person of ordinary skill will understand to be useful from the teachings herein. Additionally, the frequency determination may be accomplished by integrated circuits which are specifically designed to perform the task.

The frequency determination operation is preferred to be continuously repeated to keep a running determination of the power frequency. For each frequency determination the corresponding power source output power, or other information corresponding to that frequency (e.g. overload, fault, emergency) is determined. That frequency to information to power information relationship may be stored in memory with each frequency determination simply looked up from the memory to determine its power or other meaning. The storage of the frequency to power relationship may be done during manufacture, or may be entered via the user input(s) 36.

Once the output power or other information is determined, the processor operates in response to load information which has also been stored in memory, such information providing the basis for processor 19 to deciding what, if anything, should be done. As one example, if the standard frequency is 60.0 Hz, and the output power frequency is 60.0 Hz, then nothing would be done. If the load priority is $10^{th}$ out of a possible 10 and the frequency is 59.7 Hz representing a power output of 70-79% of maximum, the load might be disconnected according to a program which looks up a list of actions for the load's priority and different power output amounts. If the load module 44 includes a current limit capability, the loads current might be reduced by 20%. By use of power sense 17 or 17a, the processor can measure the current drawn by the load, calculate 20% of that current, and control 33 to limit the current provided to the load to 80% of the full amount that the load normally draws. The storage of the frequency to power relationship and other information which is needed to manage the responses to the power frequency, include management of the operation of 33, may be done during manufacture, or may be entered via the user input(s) 36. Additionally, 36 may provide information to facilitate user interactions during setup and operation of 44, as well as providing status and other information to the user.

This simplified operations of the power sources and load module above are provided by way of example to aid in the understanding the use of controlled power frequency to convey power source load and other information to a load module in order to control loading on the power source to prevent and mitigate overloads. The priority applications discuss load sources and load control in much greater detail and it will be known to the person of ordinary skill in the art from the teachings herein and in the priority applications to utilize controlled power frequency in conjunction with the priority application teachings to practice the invention in a manner which provides a desired degree of performance at a desired cost as desired to suit a particular power source and load system and operation.

One additional particular use of the device of FIG. 6, with or without load control capability, is as a display of the power source information, for example displaying the timely loading, voltage (at the power input 38), or with suitable data being sent via power frequency, voltage at the power source, power factor, and other such information. This display of power source information may be provided without any load control if desired.

The several simplifications, operational related examples and exemplary descriptions used herein in conjunction with the descriptions of the prior art and the teachings of the preferred embodiment of the invention are not to be considered limiting of the inventive concepts which are herein disclosed. Although this invention has been described in its preferred embodiment with a certain degree of particularity, it is understood that the invention is not so limited and the present disclosure of the preferred embodiment with its various benefits, features and capabilities has been made by way of example and numerous changes in the details of construction and the combination and arrangement of parts may be resorted to in order to meet a particular level of performance, reliability and cost without departing from the spirit and the scope of the invention as hereinafter claimed.

The invention claimed is:

1. A frequency controlled AC power source apparatus comprising:
 a) an AC power circuit which receives input electric power from a power source and in response thereto provides output AC power for use by connected loads, with the alternating frequency of the output AC power being changeably controllable in response to an electronic frequency control signal;
 b) a power sensing circuit operative in response to a timely amount of power provided from the power source via the AC power circuit and optionally further the provided output AC power or demand from or respective output AC power to individual ones of the connected loads;
 c) one or more processor circuits operating in response to the power sensing circuit to provide the electronic frequency control signal whereby the alternating frequency of the output AC power is controlled to have a plurality of controlled and known frequencies which correspond and are responsive to the timely amount of power provided from the power source sensed by the power sensing circuit; the one or more processor circuits monitoring the frequency of the provided output AC power, and selectively controlling connection to or an amount of power consumed by one or more of the connected loads in response to the frequency of the provided output AC power.

2. The apparatus of claim 1 wherein the AC power circuit has at least one known maximum output AC power parameter, with the one or more processor circuits being further responsive thereto to provide the electronic frequency control signal.

3. The apparatus of claim 2 wherein the plurality of controlled and known frequencies correspond to and represent respective percentages or ranges of percentages of the at least one known maximum output AC power parameter which is being timely output from the AC power circuit.

4. The apparatus of claim 1 wherein the plurality of controlled and known frequencies includes a second frequency which represents the power sensing circuit indicating a timely amount of power being sensed which indicates an overload of the AC power circuit.

5. The apparatus of claim 1 wherein the plurality of controlled and known frequencies includes a first known frequency which represents a timely amount of output AC power which does not create an overload and a second known frequency which represents a timely amount of output AC power which creates an overload of the AC power circuit.

6. The apparatus of claim 1 wherein the plurality of controlled and known frequencies includes a standard frequency which represents a first range of timely amounts of output AC power which will not overload the AC power circuit and a second frequency different than the standard frequency which represents a timely amount of output AC power which creates an overload of the AC power circuit or will create an overload of the AC power circuit if not reduced.

7. The apparatus of claim 1 wherein the plurality of controlled and known frequencies includes a standard frequency which represents a first range of timely amounts of output AC powers at or below a first threshold, a different second frequency which represents a second range of timely amounts of output AC powers above the first threshold and below a second threshold, and a third different frequency which represents timely amounts of output AC power above a third threshold where an overload of the AC power circuit will or may occur if the timely amount is not reduced.

8. The apparatus of claim 1 wherein when connected loads demand more output AC power than the AC power circuit can produce, the one or more processor circuits cause the frequency of the output AC power to change to signal an overload.

9. A frequency controlled inverter AC power source apparatus comprising:
a) an inverter circuit which receives input electric power from one or more input power source and provides output AC power, with the frequency of the output AC power being controllable to be a standard frequency and also to be one or more non-standard frequencies to thereby convey information to one or more devices connected to receive the output AC power and to one or more connected loads;

b) at least one sensing circuit responsive to a timely amount of power provided from the one or more input power source via the inverter circuit, and optionally further to at least one of:
  i) a timely parameter of the input power source,
  ii) aa timely parameter of the output AC power,
  iii) a timely parameter of the inverter,
  iv) a timely parameter of demand for output AC power by the one or more connected loads,
c) one or more processor circuits configured to respond to the at least one sensing circuit and provide a frequency control signal to the inverter circuit to controllably change the frequency of the output AC power from the standard frequency to at least one of the one or more non-standard frequencies in response to the timely amount power provided from the one or more input power source sensed by the at least one sensing circuit to convey the information to the one or more devices; the one or more devices monitoring the frequency of the provided output AC power, and selectively controlling connection to or an amount of power consumed by one or more of the connected loads in response to the frequency of the provided output AC power.

10. The apparatus of claim 9 wherein the standard frequency represents a normal operation of the frequency controlled inverter AC power source apparatus and at least one of the one or more non-standard frequencies represents an abnormal operation of the frequency controlled inverter AC power source apparatus.

11. The apparatus of claim 9 wherein the one or more input power source comprises a selected one or more of a renewable power source and a power storage device, with the frequency controlled inverter AC power source apparatus operating to provide output AC power at the standard frequency to parallel grid power when the grid power is of acceptable quality, and when grid power is not of acceptable quality, operating to provide output AC power with AC frequency changeable from the standard frequency to the one or more non-standard frequencies in response to the at least one sensing circuit.

12. The apparatus of claim 9 wherein the one or more input power source comprises a selected one or more of a renewable power source and a power storage device, with the frequency controlled inverter AC power source apparatus operating to connect to a power grid and provide output AC power having the same frequency as, and paralleled with, grid power of the power grid when the grid power is of acceptable quality, and when grid power is not of acceptable quality, the frequency controlled inverter AC power source apparatus disconnects from the power grid and utilizes one or more of the renewable power source and/or the power storage device as the input power source and operates as a variable AC frequency controlled backup power source.

13. The apparatus of claim 9 wherein the frequency control signal causes the output AC power to be the standard frequency when the inverter circuit is paralleling a grid input power source and when the one or more input power source is supplying DC input electric power and the inverter circuit is operating without an overload, and the frequency control signal causes the output AC power to be the one or more non-standard frequencies when the one or more input power source is supplying DC input electric power and the inverter circuit is overloaded.

14. The apparatus of claim 9 wherein when one or more of the connected loads demand more output AC power than the inverter circuit can produce, the processor circuit causes the frequency of the output AC power to change to signal an overload to or more of the connected loads.

15. An inverter AC power source apparatus providing frequency controlled output AC power comprising:
a) an inverter circuit receiving electrical power from at least one of a plurality of electrical power sources comprising a storage battery array and a solar panel array, and providing output AC power having an AC frequency which, in at least one mode of operation, is controllably changed in response to an electronic frequency control signal,
b) a power sensing circuit responsive to a timely measure of an amount of at last one the output AC power, and optionally further responsive to a demand for output AC power by connected loads,
c) one or more processor circuits responsive to the amount of the output AC power sensed by the power sensing circuit and providing the electronic frequency reference signal to control the inverter circuit to provide the output AC power at a first one of a plurality of frequencies in response to an absence of an overload of the inverter circuit, and at a second one of the plurality of frequencies in response to an operation of the inverter circuit resulting in an overload or will lead to an overload; the one or more processor circuits monitoring the frequency of the provided output AC power, and selectively controlling connection to or an amount of power consumed by one or more of the connected loads in response to the frequency of the provided output AC power.

16. The apparatus of claim 15 wherein the inverter AC power source apparatus comprises a user input and a user display, wherein a user may enter a threshold parameter, wherein the processor circuit is responsive to to the power sensing circuit and the threshold parameter in determining when the output AC power is controlled to be changed to the second one of the plurality of frequencies.

17. The apparatus of claim 15 wherein the inverter AC power source apparatus comprises a user input and a user display, wherein a maximum output power parameter specified by the manufacturer of the inverter AC power source apparatus may be input via the user input for use by the one or more processor circuits to determine when the inverter AC power source apparatus is overloaded.

18. The apparatus of claim 15 wherein the plurality of frequencies includes a third frequency indicating when the amount of output AC power is above a first threshold and below a second threshold, and a fourth frequency indicating when the amount of output AC power output is above the second threshold.

19. The apparatus of claim 15 further comprising a user input and a user display, wherein the user display is configured to display at least one of messages to the user, operating conditions of the inverter AC power source apparatus, and fault warnings, and the user may control operation of the inverter AC power source apparatus via the user input.

20. The apparatus of claim 15 wherein the first one of the plurality of frequencies is a standard frequency which represents a first range of normal amounts of the provided output AC power from the inverter circuit which do not create an overload of the inverter circuit, and wherein the second one of the plurality frequencies is different than the standard frequency and represents an overload of the inverter circuit and/or a demand by one or more of the connected loads for more output AC power than the inverter circuit can produce.

21. The apparatus of claim 15 wherein the apparatus operates in a plurality of modes comprising a first mode where the one or more processor circuits controls the inverter circuit to parallel a power grid to reduce grid power consumption and a second mode where grid power of the power grid is not of acceptable quality and the one or more processor circuits operates to control the inverter circuit to operate as a frequency controlled backup power source and controls the frequency of the output AC power to signal to one or more of the connected loads when it is desirable to reduce the demand of one or more of the connected loads for output AC power.

22. The apparatus of claim 15 wherein when one or more of the connected loads demand more output AC power than the inverter circuit can produce, the one or more processor circuits causes the frequency of the output AC power to change to signal to shed one or more of the connected loads.

\* \* \* \* \*